US012619725B1

(12) United States Patent
Lin et al.

(10) Patent No.: US 12,619,725 B1
(45) Date of Patent: May 5, 2026

(54) SYSTEMS AND METHODS FOR MALICIOUS COMMAND LINE AND SCRIPT DETECTION THROUGH DEPLOYMENT OF GENERATIVE ARTIFICIAL INTELLIGENCE

(71) Applicant: Splunk Inc., San Francisco, CA (US)

(72) Inventors: Cui Lin, Los Altos, CA (US); Rodolfo J. Soto, Miami, FL (US)

(73) Assignee: Cisco Technology, Inc., San Jose, CA (US)

( * ) Notice: Subject to any disclaimer, the term of this patent is extended or adjusted under 35 U.S.C. 154(b) by 51 days.

(21) Appl. No.: 18/886,740

(22) Filed: Sep. 16, 2024

Related U.S. Application Data

(60) Provisional application No. 63/658,409, filed on Jun. 10, 2024.

(51) Int. Cl.
G06F 21/56 (2013.01)

(52) U.S. Cl.
CPC ...... G06F 21/565 (2013.01); G06F 2221/034 (2013.01)

(58) Field of Classification Search
None
See application file for complete search history.

(56) References Cited

U.S. PATENT DOCUMENTS

| 7,937,344 | B2 | 5/2011 | Baum et al. |
| 8,112,425 | B2 | 2/2012 | Baum et al. |
| 8,751,529 | B2 | 6/2014 | Zhang et al. |

| 8,788,525 | B2 | 7/2014 | Neels et al. |
| 9,215,240 | B2 | 12/2015 | Merza et al. |
| 9,286,413 | B1 | 3/2016 | Coates et al. |
| 9,292,688 | B2 * | 3/2016 | Avasarala ............... G06F 21/56 |
| 10,127,258 | B2 | 11/2018 | Lamas et al. |
| 12,346,443 | B2 * | 7/2025 | Aboukhadijeh ...... G06F 21/577 |

(Continued)

OTHER PUBLICATIONS

Kucharavy et al.; Fundamentals of Generative Large Language Models and Perspectives in Cyber-Defense; source: scolar.google.com (Year: 2023).*

(Continued)

*Primary Examiner* — Kambiz Zand
*Assistant Examiner* — Mahabub S Ahmed
(74) *Attorney, Agent, or Firm* — Rutan & Tucker, LLP; Kyle M. St. James

(57) ABSTRACT

Implementations of the disclosure are directed to configuring a pre-trained large language model (LLM) to be used for zero-day attack detection of log data, scripts, commands, operators, etc. The pre-trained LLM may be configured to generate probabilistic labels for data to be analyzed as being part of a cyberthreat or cyberattack. In some instances, generative artificial intelligence (GenAI) technologies may be utilized by or with the pre-trained LLM to generate the probabilistic labels. The probabilistic labels along with features extracted from the data may be provided a machine learning model, which may also receive behavioral analysis results from a user behavioral analytics system (e.g., baseline-based behavioral models) and generate a detection report. Feedback may be utilized in retraining the pre-trained LLM model. Additionally, GenAI techniques may be utilized to generate a natural language summary of the detection report.

20 Claims, 15 Drawing Sheets

(56) References Cited

U.S. PATENT DOCUMENTS

| | | | |
|---|---|---|---|
| 2015/0215325 A1* | 7/2015 | Ogawa | H04L 63/1416 726/23 |
| 2019/0098106 A1 | 3/2019 | Mungel et al. | |
| 2019/0188212 A1* | 6/2019 | Miller | G06N 7/01 |
| 2020/0387602 A1* | 12/2020 | Kursun | G06F 21/554 |
| 2021/0141897 A1* | 5/2021 | Seifert | G06F 21/566 |
| 2022/0067146 A1* | 3/2022 | Cai | G06F 21/566 |
| 2022/0101125 A1* | 3/2022 | Krompaß | G06N 3/084 |
| 2023/0308465 A1* | 9/2023 | Alroobaea | H04L 63/205 |
| 2023/0342465 A1* | 10/2023 | Sevcenko | G06F 21/565 |
| 2024/0338491 A1* | 10/2024 | Al Faruque | G06F 21/56 |
| 2024/0370556 A1* | 11/2024 | Coull | G06F 21/554 |
| 2024/0403135 A1* | 12/2024 | Venkataraman | G06F 9/45558 |
| 2025/0094571 A1* | 3/2025 | Taghia | G06F 21/554 |
| 2025/0165717 A1* | 5/2025 | Burton | G06T 11/206 |
| 2025/0190884 A1* | 6/2025 | Silver | G06N 5/025 |
| 2025/0209156 A1* | 6/2025 | Sankaran | H04L 63/1425 |
| 2025/0217673 A1* | 7/2025 | Silver | G06N 5/025 |
| 2025/0284721 A1* | 9/2025 | Agrawal | G06F 16/3329 |
| 2025/0286903 A1* | 9/2025 | Fortkort | H04L 63/1416 |
| 2025/0300904 A1* | 9/2025 | Fortkort | H04L 67/12 |
| 2025/0363216 A1* | 11/2025 | Taneja | G06F 21/64 |
| 2025/0378310 A1* | 12/2025 | Khatri | H04L 63/1425 |
| 2025/0379885 A1* | 12/2025 | Murphy | G06F 16/345 |

OTHER PUBLICATIONS

Sinan Sakaoglu; Novel method for detecting logical vulnerabilities in web applications with finetuned Large Language Models; source: scolar.google.com (Year: 2023).*

Deng et al.; PENTESTGPT: An LLM-empowered Automatic Penetration Testing Tool; source: scolar.google.com (Year: 2023).*

Liu et al.; Prompt Injection attack against LLM-integrated Applications; source: scholar.google.com (Year: 2024).*

Seyed Mohammad Taghavi; Using Large Language Models to Better Detect and Handle SoftwareVulnerabilities and Cyber Security Threats; source: scholar.google.com (Year: 2024).*

Deng et al.; PENTESTGPT: Evaluating and Harnessing Large Language Models for Automated Penetration Testing; source: scholar.google.com (Year: 2024).*

Akuthota1, et al.; Vulnerability Detection and Monitoring Using LLM; source: scholar.google.com (Year: 2023).*

Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.

Carraso, David, "Exploring Splunk," published by CITO Research, New York, NY, Apr. 2012.

Splunk Cloud 8.0.2004 User Manual, available online, retrieved May 20, 2020 from docs.splunk.com.

Splunk Enterprise 8.0.0 Overview, available online, retrieved May 20, 2020 from docs.splunk.com.

Splunk Quick Reference Guide, updated 2019, available online at https://www.splunk.com/pdfs/solution-guides/splunk-quick-reference-guide.pdf, retrieved May 20, 2020.

* cited by examiner

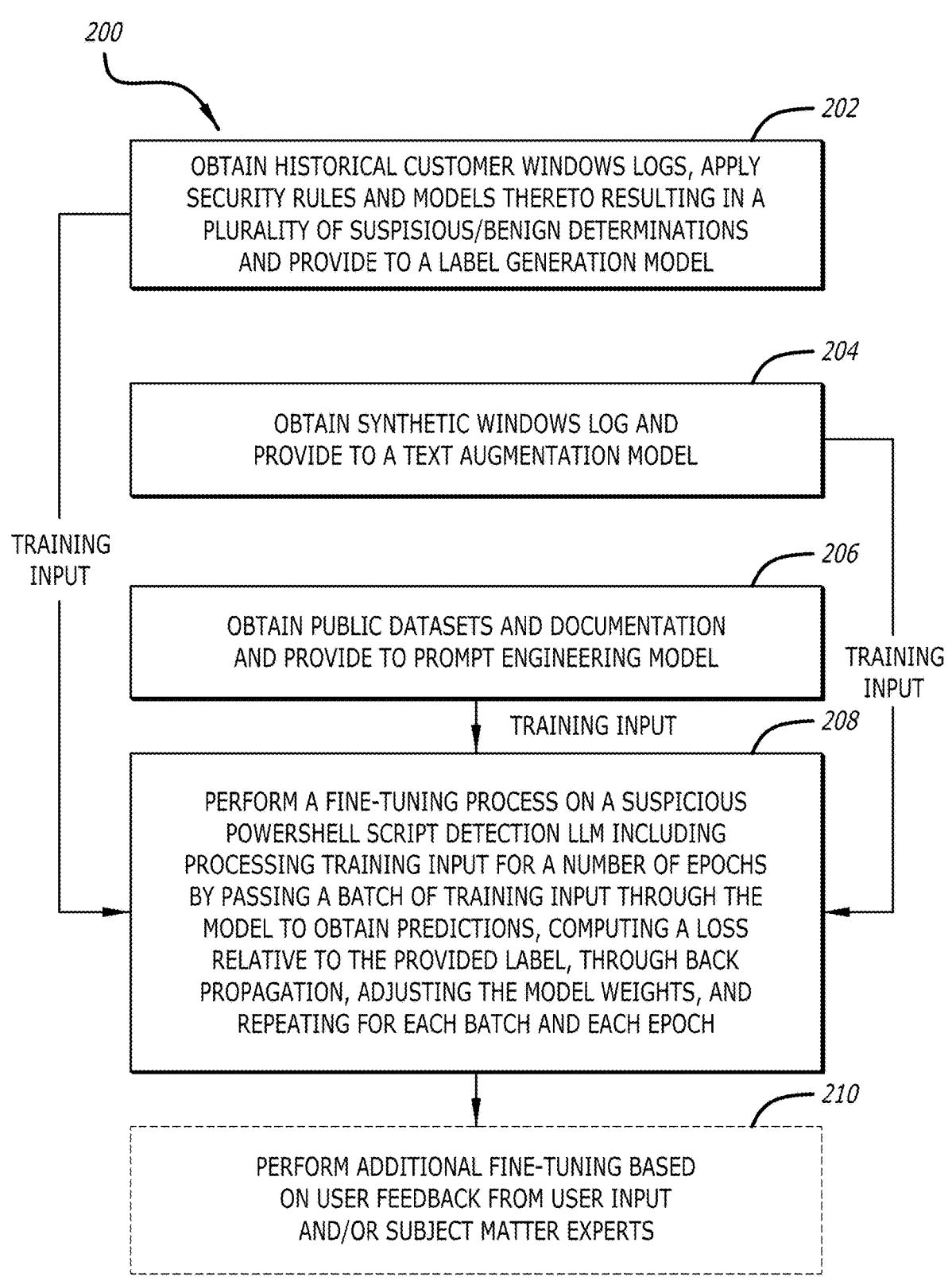

*200*

*202*

OBTAIN HISTORICAL CUSTOMER WINDOWS LOGS, APPLY SECURITY RULES AND MODELS THERETO RESULTING IN A PLURALITY OF SUSPISIOUS/BENIGN DETERMINATIONS AND PROVIDE TO A LABEL GENERATION MODEL

*204*

OBTAIN SYNTHETIC WINDOWS LOG AND PROVIDE TO A TEXT AUGMENTATION MODEL

TRAINING INPUT

*206*

OBTAIN PUBLIC DATASETS AND DOCUMENTATION AND PROVIDE TO PROMPT ENGINEERING MODEL

TRAINING INPUT

TRAINING INPUT

*208*

PERFORM A FINE-TUNING PROCESS ON A SUSPICIOUS POWERSHELL SCRIPT DETECTION LLM INCLUDING PROCESSING TRAINING INPUT FOR A NUMBER OF EPOCHS BY PASSING A BATCH OF TRAINING INPUT THROUGH THE MODEL TO OBTAIN PREDICTIONS, COMPUTING A LOSS RELATIVE TO THE PROVIDED LABEL, THROUGH BACK PROPAGATION, ADJUSTING THE MODEL WEIGHTS, AND REPEATING FOR EACH BATCH AND EACH EPOCH

*210*

PERFORM ADDITIONAL FINE-TUNING BASED ON USER FEEDBACK FROM USER INPUT AND/OR SUBJECT MATTER EXPERTS

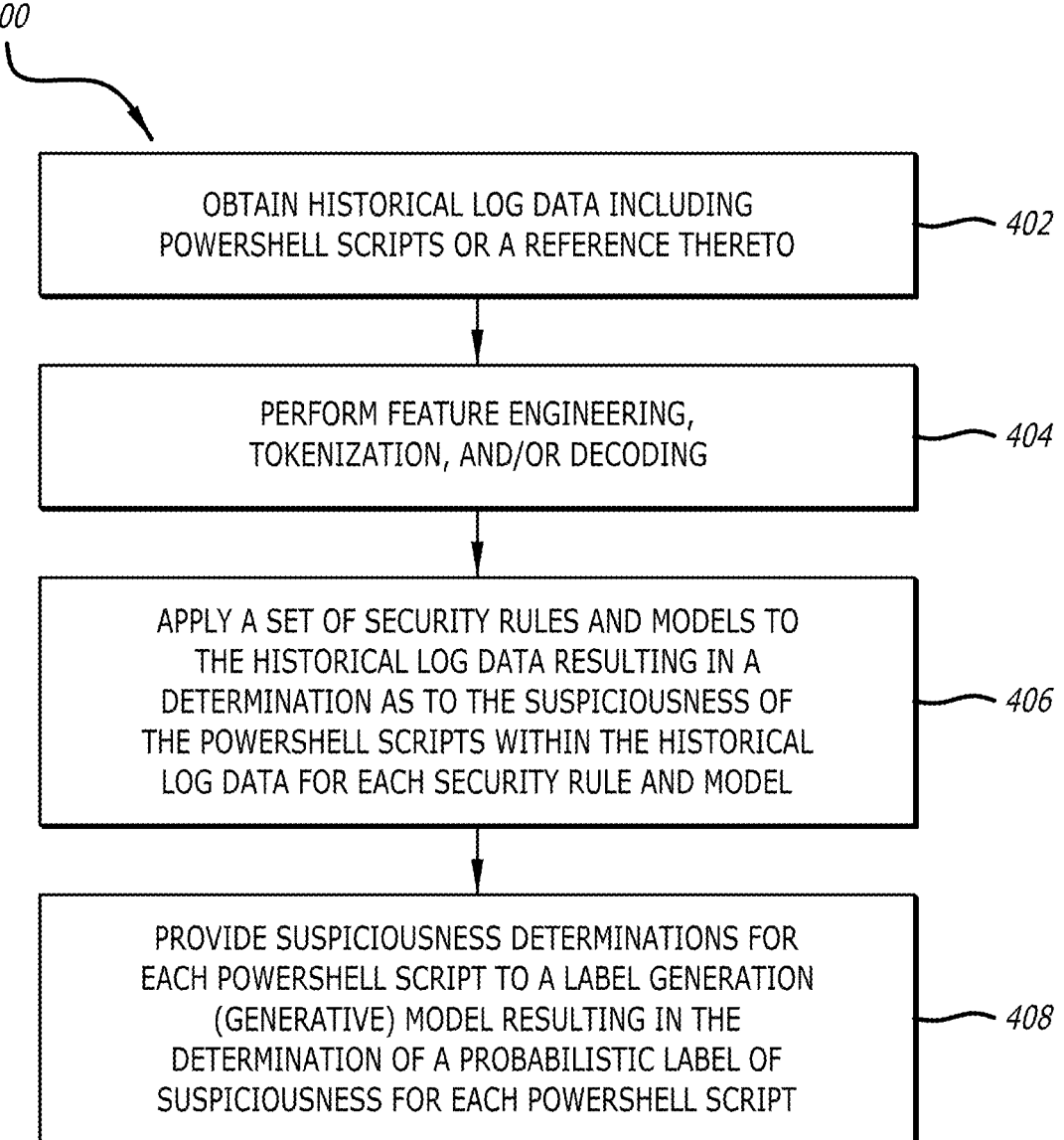

OBTAIN HISTORICAL LOG DATA INCLUDING
POWERSHELL SCRIPTS OR A REFERENCE THERETO — *402*

PERFORM FEATURE ENGINEERING,
TOKENIZATION, AND/OR DECODING — *404*

APPLY A SET OF SECURITY RULES AND MODELS TO
THE HISTORICAL LOG DATA RESULTING IN A
DETERMINATION AS TO THE SUSPICIOUSNESS OF
THE POWERSHELL SCRIPTS WITHIN THE HISTORICAL
LOG DATA FOR EACH SECURITY RULE AND MODEL — *406*

PROVIDE SUSPICIOUSNESS DETERMINATIONS FOR
EACH POWERSHELL SCRIPT TO A LABEL GENERATION
(GENERATIVE) MODEL RESULTING IN THE
DETERMINATION OF A PROBABILISTIC LABEL OF
SUSPICIOUSNESS FOR EACH POWERSHELL SCRIPT — *408*

*FIG. 4*

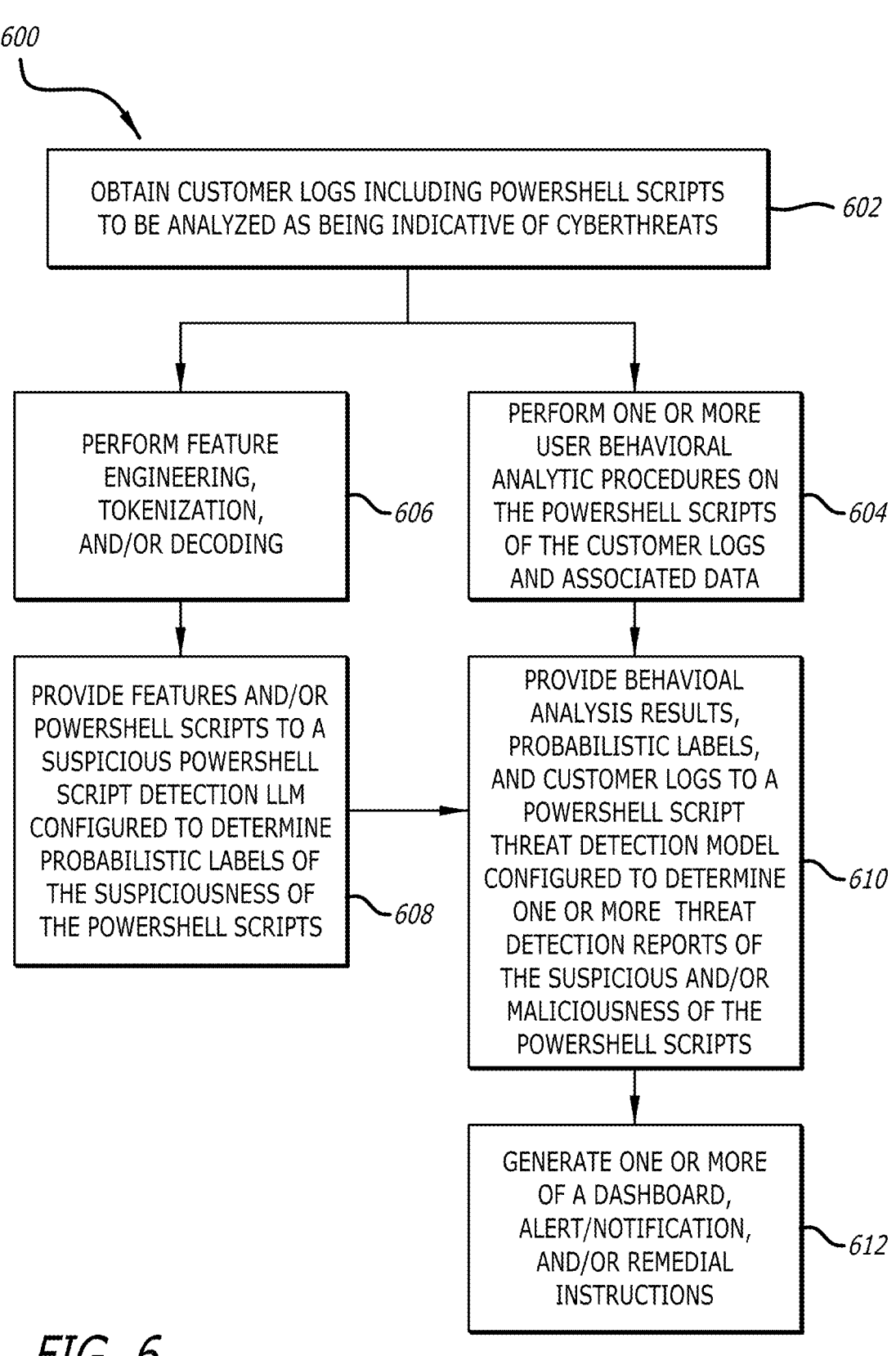

600

OBTAIN CUSTOMER LOGS INCLUDING POWERSHELL SCRIPTS TO BE ANALYZED AS BEING INDICATIVE OF CYBERTHREATS ——602

PERFORM FEATURE ENGINEERING, TOKENIZATION, AND/OR DECODING ——606

PERFORM ONE OR MORE USER BEHAVIORAL ANALYTIC PROCEDURES ON THE POWERSHELL SCRIPTS OF THE CUSTOMER LOGS AND ASSOCIATED DATA ——604

PROVIDE FEATURES AND/OR POWERSHELL SCRIPTS TO A SUSPICIOUS POWERSHELL SCRIPT DETECTION LLM CONFIGURED TO DETERMINE PROBABILISTIC LABELS OF THE SUSPICIOUSNESS OF THE POWERSHELL SCRIPTS ——608

PROVIDE BEHAVIOAL ANALYSIS RESULTS, PROBABILISTIC LABELS, AND CUSTOMER LOGS TO A POWERSHELL SCRIPT THREAT DETECTION MODEL CONFIGURED TO DETERMINE ONE OR MORE THREAT DETECTION REPORTS OF THE SUSPICIOUS AND/OR MALICIOUSNESS OF THE POWERSHELL SCRIPTS ——610

GENERATE ONE OR MORE OF A DASHBOARD, ALERT/NOTIFICATION, AND/OR REMEDIAL INSTRUCTIONS ——612

FIG. 6

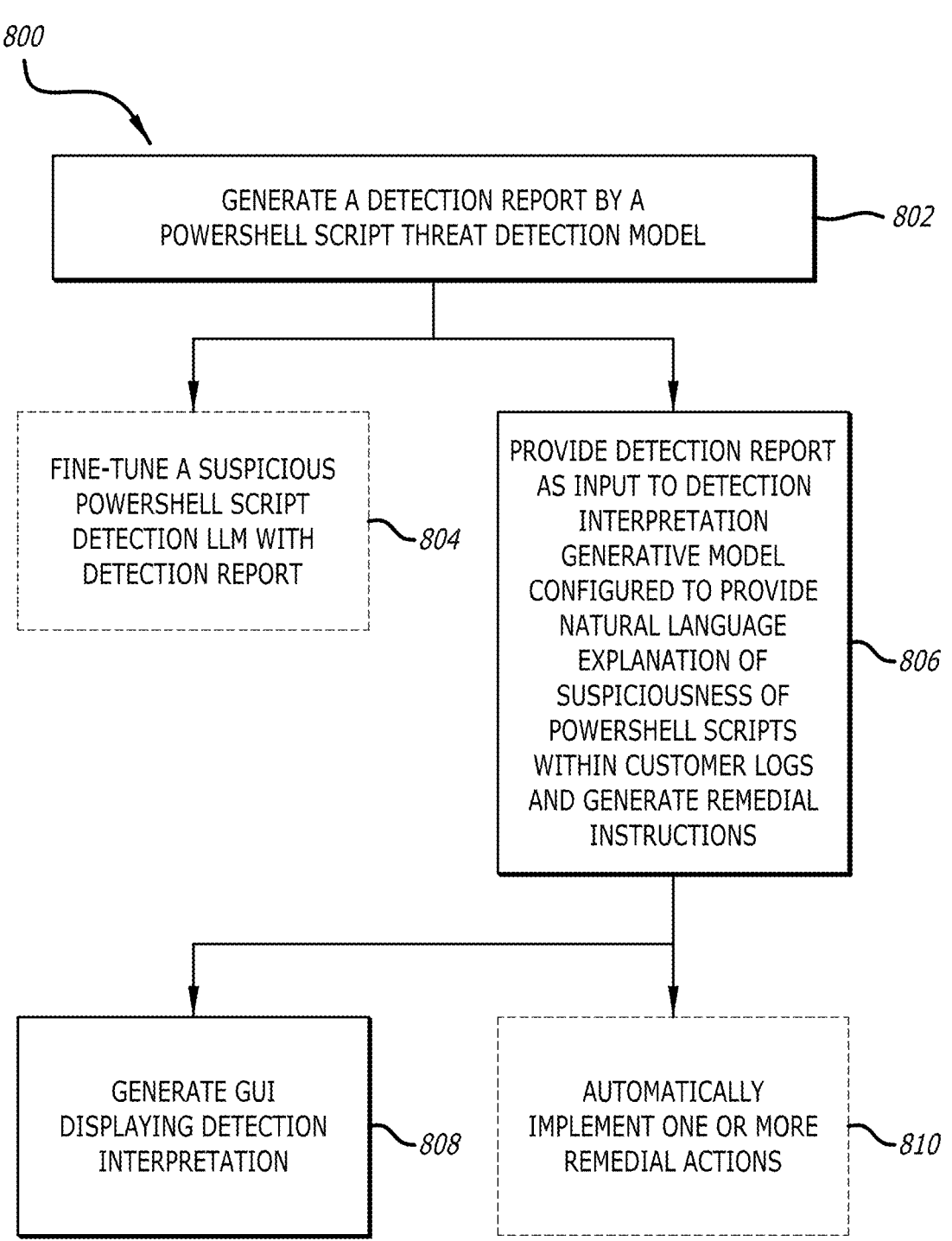

*800*

GENERATE A DETECTION REPORT BY A
POWERSHELL SCRIPT THREAT DETECTION MODEL     *802*

FINE-TUNE A SUSPICIOUS
POWERSHELL SCRIPT
DETECTION LLM WITH
DETECTION REPORT     *804*

PROVIDE DETECTION REPORT
AS INPUT TO DETECTION
INTERPRETATION
GENERATIVE MODEL
CONFIGURED TO PROVIDE
NATURAL LANGUAGE
EXPLANATION OF
SUSPICIOUSNESS OF
POWERSHELL SCRIPTS
WITHIN CUSTOMER LOGS
AND GENERATE REMEDIAL
INSTRUCTIONS     *806*

GENERATE GUI
DISPLAYING DETECTION
INTERPRETATION     *808*

AUTOMATICALLY
IMPLEMENT ONE OR MORE
REMEDIAL ACTIONS     *810*

FIG. 8

*1000*

*FIG. 10*

OBTAIN HISTORICAL LOG DATA INCLUDING A PLURALITY OF LOGS BEING RECORDINGS OF ACTIVITIES OR OCCURRENCES DURING OPERATION OF A NETWORK DEVICE, WHEREIN EACH RECORDING INCLUDES OR INVOLVES A SCRIPT OR AN EXECUTABLE FILE ──*1002*

OBTAIN SYNTHETIC LOG DATA INCLUDING A PLURALITY OF SYNTHETIC LOGS BEING SYNTHETIC DATA REPRESENTATIVE OF ACTIVITIES OR OCCURRENCES DURING OPERATION OF THE NETWORK DEVICE, WHEREIN THE SYNTHETIC DATA INCLUDE OR INVOLVE SYNTHETIC SCRIPTS OR SYNTHETIC EXECUTABLE FILES THAT INCLUDE A LABEL INDICATING WHETHER EACH SYNTHETIC SCRIPT OR SYNTHETIC EXECUTABLE FILE IS SUSPICIOUS OR BENIGN ──*1004*

DEPLOY A FIRST GENERATIVE MACHINE LEARNING MODEL BY PROVIDING THE HISTORICAL LOG DATA AND SYNTHETIC LOG DATA AS INPUT, WHEREIN THE FIRST GENERATIVE MACHINE LEARNING MODEL IS TRAINED AND CONFIGURED TO GENERATE TRAINING PROBABILISTIC LABELS INDICATING A FIRST LEVEL OF SUSPICIOUSNESS FOR EACH SCRIPT OR EXECUTABLE FILE OF THE HISTORICAL LOG DATA ──*1006*

PERFORM A RE-TRAINING PROCESS OR A FINE-TUNING PROCESS ON A LARGE LANGUAGE MODEL (LLM) INCLUDING:
 PROCESSING A BATCH OF THE PLURALITY OF LOGS OF THE HISTORICAL LOG DATA TO GENERATE SECOND PROBABILISTIC LABELS INDICATING A SECOND LEVEL OF SUSPICIOUSNESS FOR EACH SCRIPT OR EXECUTABLE FILE OF THE BATCH OF THE PLURALITY OF LOGS,
 DETERMINING A LOSS BETWEEN THE SECOND PROBABILISTIC LABELS AND CORRESPONDING LABELS OF THE TRAINING PROBABILISTIC LABELS, AND
 ADJUSTING WEIGHTS OR PARAMETERS OF THE LLM ACCORDING TO THE LOSS ──*1008*

STORE THE LLM FOLLOWING IMPLEMENTATION OF THE RE-TRAINING OR THE FINE-TUNING PROCESS ──*1010*

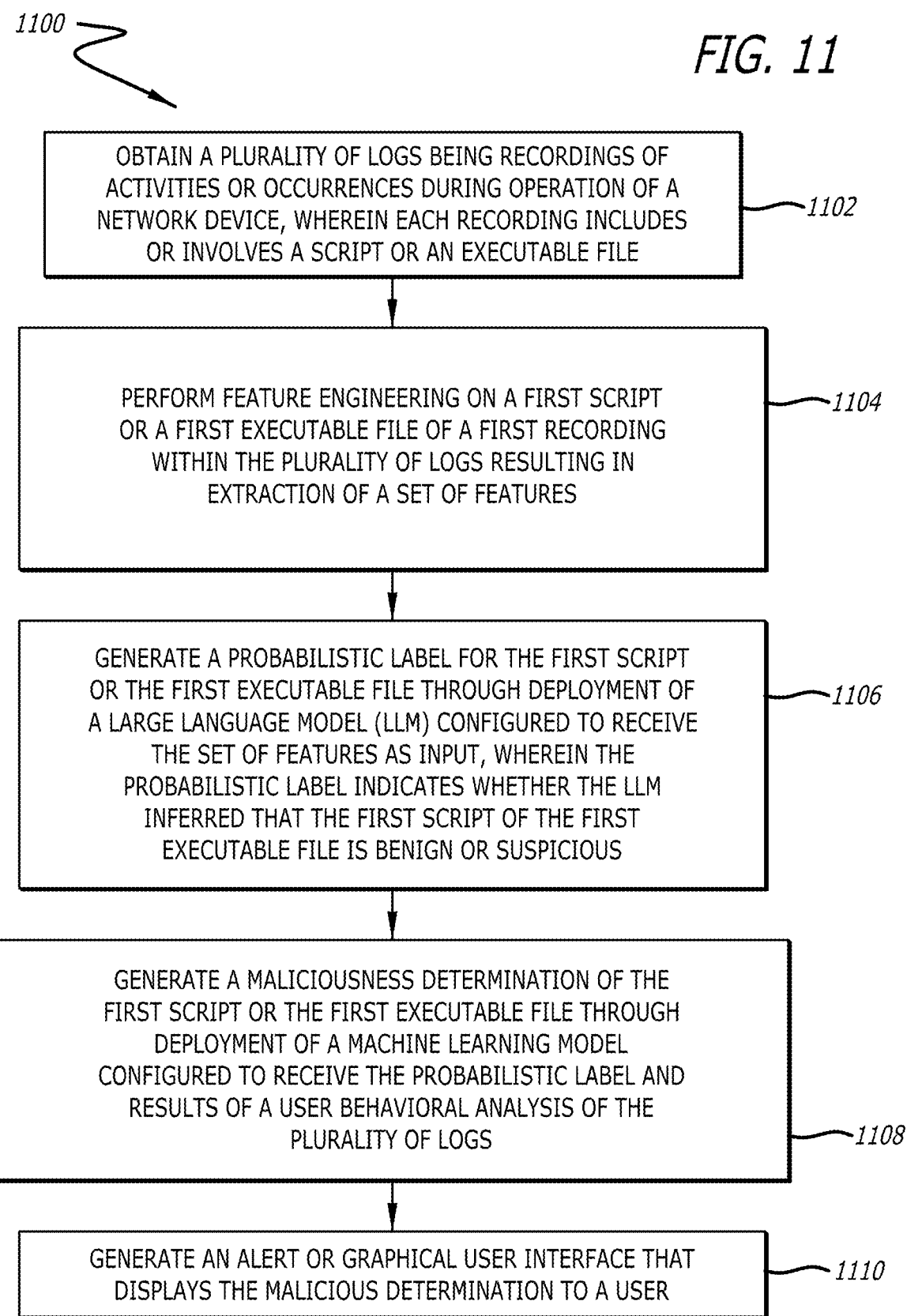

OBTAIN A PLURALITY OF LOGS BEING RECORDINGS OF ACTIVITIES OR OCCURRENCES DURING OPERATION OF A NETWORK DEVICE, WHEREIN EACH RECORDING INCLUDES OR INVOLVES A SCRIPT OR AN EXECUTABLE FILE ~1102

PERFORM FEATURE ENGINEERING ON A FIRST SCRIPT OR A FIRST EXECUTABLE FILE OF A FIRST RECORDING WITHIN THE PLURALITY OF LOGS RESULTING IN EXTRACTION OF A SET OF FEATURES ~1104

GENERATE A PROBABILISTIC LABEL FOR THE FIRST SCRIPT OR THE FIRST EXECUTABLE FILE THROUGH DEPLOYMENT OF A LARGE LANGUAGE MODEL (LLM) CONFIGURED TO RECEIVE THE SET OF FEATURES AS INPUT, WHEREIN THE PROBABILISTIC LABEL INDICATES WHETHER THE LLM INFERRED THAT THE FIRST SCRIPT OF THE FIRST EXECUTABLE FILE IS BENIGN OR SUSPICIOUS ~1106

GENERATE A MALICIOUSNESS DETERMINATION OF THE FIRST SCRIPT OR THE FIRST EXECUTABLE FILE THROUGH DEPLOYMENT OF A MACHINE LEARNING MODEL CONFIGURED TO RECEIVE THE PROBABILISTIC LABEL AND RESULTS OF A USER BEHAVIORAL ANALYSIS OF THE PLURALITY OF LOGS ~1108

GENERATE AN ALERT OR GRAPHICAL USER INTERFACE THAT DISPLAYS THE MALICIOUS DETERMINATION TO A USER ~1110

FIG. 14

SYSTEMS AND METHODS FOR MALICIOUS COMMAND LINE AND SCRIPT DETECTION THROUGH DEPLOYMENT OF GENERATIVE ARTIFICIAL INTELLIGENCE

RELATED APPLICATIONS

Any and all applications for which a foreign or domestic priority claim is identified in the Application Data Sheet as filed with the present application are incorporated by reference under 37 CFR 1.57 and made a part of this specification.

BACKGROUND

PowerShell is a powerful scripting language and shell framework primarily used on network devices running a version of the WINDOWS® operating system. The Power-Shell scripting language has been around for many years, is used by many system administrators, and is on track to replace the default command prompt within the WIN-DOWS® operating systems in the future. According to a research study by Symantec Corporation, nearly 95.4% of all scripts analyzed by the Blue Coat Sandbox offered by Symantec Corporation were malicious. A recent study also showed PowerShell scripts have become the attack technique that is most often used by threat actors. For example, the Red Canary study indicated that approximately 22% of its customers were affected in 2023 by a cyberattack involving PowerShell. Malicious PowerShell scripts may be predominantly used as downloaders, e.g., macros used with MICROSOFT OFFICE®, during the incursion phase of a cyber-attack. Another common use occurs during the lateral movement phase of a cyber-attack, allowing malicious code execution on a remote network when spreading inside the network. PowerShell scripts may also download and execute commands directly from memory, making it hard for forensics experts to trace the infection. Threat actors may generally use PowerShell to execute commands, evade detection, obfuscate malicious activity, spawn additional processes, remotely download and execute arbitrary code and binaries, gather information, and/or change system configurations. In some instances, PowerShell has been used by threat actors to disable Windows security tools.

BRIEF DESCRIPTION OF THE DRAWINGS

Illustrative examples are described in detail below with reference to the following figures:

FIG. 2 is a flowchart illustrating example operations for performing a fine-tuning process of a large language model (LLM) configured to generate probabilistic labels as to the suspiciousness of PowerShell scripts according to an implementation of the disclosure;

FIG. 4 is a flowchart illustrating example operations for generating probabilistic labels by a generative model from customer log data according to an implementation of the disclosure;

FIG. 6 is a flowchart illustrating example operations for generating probabilistic labels by a generative model from customer log data according to an implementation of the disclosure;

FIG. 8 is a flowchart illustrating example operations for generating a threat detection report according to an implementation of the disclosure;

FIG. 10 is a flowchart illustrating example operations for performing automated label generation and training operations of a large language model according to an implementation of the disclosure;

FIG. 11 is a flowchart illustrating example operations for deploying a machine learning model configured to generate a malicious determination of a script or executable file according to an implementation of the disclosure;

FIG. 14 is a block diagram illustrating in greater detail an example of the search system of a data intake and query system, such as the data intake and query system of FIG. 12 according to an implementation of the disclosure.

DETAILED DESCRIPTION

Figure 1:
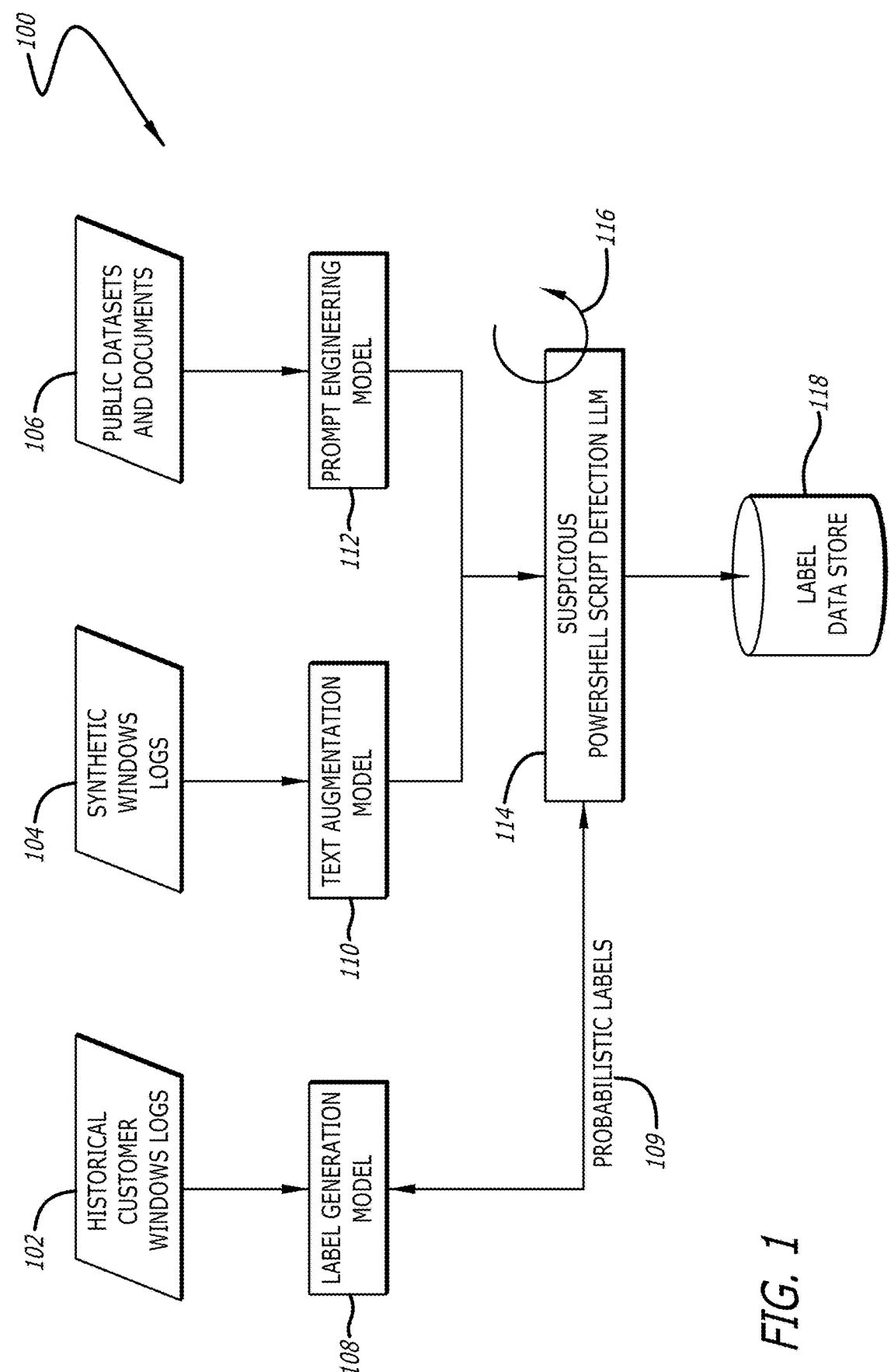
FIG. 1 is a block diagram illustrating a diagrammatic flow of the processing of data resulting in the fine-tuning of a large language model (LLM) configured to generate probabilistic labels as to the suspiciousness of PowerShell scripts according to an implementation of the disclosure.

Traditionally, security rules are applied to system data with each security rule potentially generating an alert based on the application of the rule. While some security rules address specific behavioral abnormalities, an individual security rule on its own may not be deterministic as to the maliciousness of a detected anomaly. As a result, many alerts may be generated but few, if any, are deterministic on their own of maliciousness. Further, security rules often overlap or even conflict with each other, as a result of being developed by different researchers or at different points in time to address different cyber-threats. Another disadvantage of using security rules is that they may require a parameter or threshold configuration, which may be difficult to determine manually.

Current behavioral analysis systems primarily use anomaly scoring to assess the risk of detection results, which requires manual interventions, such as tuning weights of each rule and model of the behavioral analysis system to determine the importance and relevance of the detection outcome. As should be understood, manual tuning of parameters is not possible given the complexity of the quantitative nature of the interdependency of parameters on one another and which have a higher level (weight) of importance relative to the others.

One key approach of a behavioral analysis system is to learn normal patterns from either rules or models within a certain timeframe. However, an issue with this approach is that analyzing benign data and learning normal (baseline) patterns does not contribute to the machine-learning models comprising the behavioral analysis systems learning how to detect malicious data patterns. However, large corpora of malicious data are often not available. With current technology and implementations of behavioral analysis systems, baseline based behavioral analysis typically requires 30 days for learning the "normal" patterns. As a result, while the behavioral analysis system may miss the attacks that occur from day 1 through day 30 following deployment.

Implementations of the disclosure provide a detection framework that is composed of pre-trained machine learning models configured to detect malicious data such as Power-Shell scripts from events in a network or computer system recorded via Microsoft Windows logs. The detection framework is configured to enable the pre-trained models to evolve and continue updating weights/parameters based on detection results of security rules and other models.

In certain implementations, data is obtained from various data sources including historical log data, synthetic log data, and public datasets and documents. As discussed below, such historical log data is often missing labels as to its suspiciousness and synthetic log data may include labels as to suspiciousness but often lacks numerous features (e.g., may lack IP address information, user information, device information, domain name system (DNS) information, etc.). While public datasets or documents may include verified labels (often referred to as "golden labels"), the examples are often too few to properly train a model (e.g., the ratio between benign and suspicious scripts in many datasets may be between 1000:1 and 10,000:1).

In view of the above, aspects of the disclosure provide for the automated generation of probabilistic labels for the historical data by analyzing such with security rules and machine learning models to create a vector (or matrices) of detection results, which is provided to a generative machine-learning model configured to provide probabilistic labels. The historical data and the probabilistic labels are then provided to a large learning model (LLM) as a first input, e.g., a discriminative LLM.

Aspects of the disclosure further provide for augmenting the synthetic data using text augmentation techniques, which may include deployment of a text augment model, resulting in augmented synthetic data. In some instances, the augmentation is based on predefined fields (features) provided to the second generative model such that values for the fields are generated by the second generative model. The augmented synthetic data is then provided to the LLM as a second input.

Yet other aspects of the disclosure provide for prompt engineering public datasets having golden labels (e.g., labels that have been verified publicly, often by numerous sources). For example, a third generative model may perform feature generation and tokenization on such datasets and populate predefined prompt templates based on data extracted from public datasets for the LLM, which collectively may be provided to the LLM as a third input. The LLM is configured to process the first, second, and third inputs resulting in its own probabilistic labels of the historical data, which may be used to fine-tune the LLM. The probabilistic labels generated by the LLM may be stored for future utilization, training, and/or fine-tuning.

In addition to the above discussed aspects of the disclosure, also provided herein is a deployment implementation in which data, such as current customer logs, are obtained and analyzed by an anomaly detection system and a LLM fine-tuned to generate its own probabilistic labels. The data, the probabilistic labels, and the results of the user behavioral analytics are provided to a machine learning model configured to determine whether the data is suspicious, malicious, or benign and generate a detection report that correlates any suspicious or malicious data with broader detected anomalies such as anomalous data points, anomalous patterns, trends, or behaviors detected within a network. The detection report may be provided to a user such as a security operations center (SOC) analyst via a graphical user interface (dashboard), a chat interface, and/or alerts or notifications (e.g., via an email, a text message, visual indication within a dedicated software application or on a webpage). Additionally, instructions for remediation measures may be automatically generated and transmitted to the user and/or third-party systems or applications such as MICROSOFT OUTLOOK®.

While much of the following discusses Windows log data and specifically the analysis of PowerShell scripts, the disclosure is not intended to be so limited. Specifically, the generation of labels or augmentation of data using generative models to create training data to fine-tune a LLM configured to generate probabilistic labels of data may be applicable to software beyond log data, e.g., scripts (mobile scripts, JAVA® scripts, etc.), commands, operators, etc. Similarly, the systems and methods disclosed herein apply equally to aspects of operating systems beyond that of Windows, such as Android, Linux, etc. Analysis of probabilistic labels generated by a LLM and the data itself by a machine learning model configured to determine whether the data are suspicious, malicious, or benign in view of anomaly detection results, may be applicable to software beyond log data, e.g., scripts, commands, operators, etc. Thus, the examples below are illustrative of a particular implementation pertaining to log data, and specifically, PowerShell scripts within Windows log data, such examples are merely illustrative.

Referring now FIG. 1, a block diagram illustrating a diagrammatic flow of the processing of data resulting in the fine-tuning of a large language model (LLM) configured to generate probabilistic labels as to the suspiciousness of PowerShell scripts is shown according to an implementation of the disclosure. The diagrammatic flow 100 of FIG. 1 illustrates one example implementation for generating data for fine-tuning 116 of a model, namely, the suspicious PowerShell script detection LLM 114. The models illustrated in FIG. 1 may be part of a larger analysis system, such as that illustrated in FIG. 5.

The diagrammatic flow 100 illustrates that various data may be received by the analysis system with such data including historical customer Windows logs 102, synthetic Windows logs 104, and public datasets and documents (public datasets) 106. The historical customer Windows logs 102 may include Windows Events that are activities or occurrences during operation of a network device and that are recorded by an operating system or other logging/recording application. Windows Events typically have a set structure that includes standard components such as an EventID, an EventRecordID, an ExecutionProcessID, a ThreadID, etc. An example Windows Event is as follows:

```
<Event xmlns='http://schemas.microsoft.com/win/2004/08/events/event'>
<System>
<Provider Name='Microsoft-Windows-Security-Auditing' Guid='{54849625-5478-
4994-A5BA-3E3B0328C30D}'/>
<EventID>4688</EventID>
<Version>2</Version>
<Level>0</Level>
<Task>13312</Task>
<Opcode>0</Opcode>
<Keywords>0x8020000000000000</Keywords>
<TimeCreated SystemTime="$TIMESTAMP$"/>
<EventRecordID>127601</EventRecordID>
<Correlation/>
<Execution ProcessID='4' ThreadID='2212'/>
<Channel>Security</Channel>
<Computer>SesTestWin2012.SesTestDomain.local</Computer>
<Security/>
</System>
<EventData>
<Data Name='SubjectUserSid'>SESTESTWIN2012\splunker</Data>
<Data Name='SubjectUserName'>splunker</Data>
<Data Name='SubjectDomainName'>SESTESTWIN2012</Data>
<Data Name='SubjectLogonId'>0x296174</Data>
<Data Name='NewProcessId'>0xe90</Data>
<Data Name='NewProcessName'>C:\Windows\System32\runas.exe</Data>
<Data Name='TokenElevationType'>%%1938</Data>
<Data Name='ProcessId'>0x1108</Data>
<Data Name='CommandLine'>C:\Program Files\Git\cmd\git.exe" clone
https://github.com/dafthack/MailSniper.git C:\tools\MailSniper</Data>
<Data Name='TargetUserSid'>NULL SID</Data>
<Data Name='TargetUserName'>-</Data>
<Data Name='TargetDomainName'>-</Data>
<Data Name='TargetLogonId'>0x0</Data>
<Data
Name="ParentProcessName">C:\Windows\System32\WindowsPowerShell\v1.0\powersh
ell.exe</Data>
<Data Name="MandatoryLabel">Mandatory Label\High Mandatory Level</Data>
</EventData>
```

The example Windows Event is shown to include a PowerShell script, "C:\Program Files\Git\cmd\git.exe" clone https://github.com/dafthack/MailSniper.git C:\tools\MailSniper". As a result, the Windows Event may be analyzed as follows with respect to FIGS. 1-4 in order to generate a label as to the suspiciousness of the PowerShell script included therein, where the label and Windows Event may be utilized in fine-tuning a model (LLM) as discussed below. Each of the log data 102, 104, 106 may include several Windows Events with each being analyzed, processed, or augmented as discussed below. Stated differently, the historical Windows logs 102, for example, may include a plurality of Windows Events that each include a PowerShell script such that a label generation model 108 generates a probabilistic label for each PowerShell script.

Referring back to FIG. 1, the historical Windows logs 102 are obtained by the label generation model 108. While historical Windows logs may be generally accessible, these logs often lack any labeling of the suspiciousness of PowerShell scripts included therein. While the components of a Windows Event including a PowerShell script may be available, such are not overly useful in training or fine-tuning a model without labels. Thus, one important aspect of FIG. 1 is the generation of probabilistic labels 109 for each of the PowerShell scripts within Windows Events of the historical Windows logs 102. The label generation model 108 may be a generative adversarial network (GAN) model, and be comprised of two neural networks, a generator and a discriminator, configured to generate probabilistic labels that indicate a probability as to the suspiciousness of a PowerShell script within a Windows Event of the historical Windows logs 102. In other implementations, the label generation model 108 may be a machine learning model trained using stochastic generalized adversarial label learning (SGAL) with example machine learning models being neural networks such as: convolutional neural networks (CNNs), recurrent neural networks (RNNs), transformers, etc.; support vector machines (SVMs), logistic regression, k-Nearest Neighbors (KNN), etc. Detail as to the processing of the Windows Events of the historical Window logs 102 resulting in generation of the probabilistic labels 109 is shown in and discussed with reference to FIGS. 3-4.

The synthetic Windows logs 104 are received by a text augmentation model 110, which may be a second generative model such as a GAN model. In some embodiments, the text augmentation model 110 is provided with a structure of a Windows Event along with the synthetic Windows logs 104 such that the text augmentation model 110 is configured to augment the Windows Events with values of fields specified in the provided structure. Examples of fields include: 'actor.process.file.path', 'actor.process.file.name', 'process.cmd_line', 'process.file.name', 'process.file.path', etc. In some implementations, such fields may also be used for feature engineering to retrieve PowerShell events, e.g., for Windows events 4688 and 7065. As the Windows Events comprising the synthetic Windows logs 104 are synthetic, a label as to the suspiciousness of the PowerShell script may be included in each Windows Event is typically provided. Therefore, processing by the text augmentation model 110 results in labeled synthetic Windows Events that have been augmented automatically (without human intervention) by a generative model to include values of fields found in a standard Windows Event that were otherwise not provided. It is noted that the operations performed by the label generation model 108 and the text augmentation model 110 are important aspects in the fine-tuning of the suspicious PowerShell script detection LLM 114 and eventual detection of threats because benign PowerShell scripts significantly outnumber suspicious PowerShell scripts, and extremely unbalanced datasets are not suitable for training an accurate model. Additionally, a benefit provided by the synthetic Windows Events is that such do not suffer from the inclusion of personally identifiable information (PII), which reduces privacy concerns with utilization and/or storage of such, because fields that would typically include PII are synthetically and automatically generated by a text generation model as discussed herein, PII does not exist for these events.

The public datasets 106 may include Windows Events including a PowerShell script having a "golden label," which may be understood as a definitive and highly accurate label as to the suspiciousness or maliciousness of the script. Windows Events with PowerShell scripts having golden labels (especially such indicating suspiciousness or maliciousness) are rare and are usually the product of multiple domain experts independently and manually labeling such. However, this process is timely and often error-prone, resulting in few very golden labels. In addition to the few Windows Event associated with a golden label, the public datasets 106 may include publicly available documents that explain suspicious scripts and may include indicators of compromise (IOC) detection results from behavioral analysis tools, natural language discussions from blog posts, MITRE technique descriptions, verified scientific or white papers, national vulnerability databases, etc., which may be extracted from the public datasets 106 and incorporated into prompt engineering.

The suspicious PowerShell script detection LLM 114 may be configured to analyze a Windows Event including a PowerShell script and provide a probabilistic label as to the suspiciousness of the PowerShell script, e.g., a probability that the script is suspicious (or alternatively, that the script is benign). In some instances, the suspicious PowerShell script detection LLM 114 may be configured to provide a probabilistic label that indicates probabilities of being benign or malicious and other examples provide for probabilities of being benign, suspicious, or malicious. The suspicious PowerShell script detection LLM 114 may be, for example, a bidirectional encoder representations from transformers (BERT) model that has been pre-trained for natural language processing (NLP) and fine-tuned on cybersecurity-specific datasets.

In many instances, the suspicious PowerShell script detection LLM 114 may be pre-trained on a large corpus of text data. Subsequently, the labels, Windows Events, and/or public datasets provided by the models 102, 104, 106 ("model results") may be utilized to re-train and/or fine-tune the suspicious PowerShell script detection LLM 114. For example, obtaining and generating the model results may be representative of data collection and pre-processing and as the suspicious PowerShell script detection LLM 114 was pre-trained, an initial set of weights has been established. The suspicious PowerShell script detection LLM 114 may then be re-trained (represented by the circular arrow 116) by processing the Windows Events within the model results instructing the suspicious PowerShell script detection LLM 114 to generate a probabilistic label for each PowerShell script included therein, compute a loss with the label of the PowerShell script provided within the model results, perform backpropagation to compute the gradients of the loss for each model parameter, and update the model parameters using an optimization algorithm according to the gradients of the loss.

Additionally, or alternatively, a fine-tuning (which may also be represented by the circular arrow 116) may be performed on the suspicious PowerShell script detection LLM 114, which is similar to the re-training discussed about but one or more of the layers of the suspicious PowerShell script detection LLM 114 are "frozen" so as to not adjust parameters of the frozen layers. Additionally, the learning rate used in fine-tuning is typically lower than that used for re-training, which results in a more subtle adjustment of model parameters. The model weights following re-training or fine-tuning may be stored in the label date store 118 along with the model results.

Referring to FIG. 2, a flowchart illustrating example operations for performing a fine-tuning process of a large language model (LLM) configured to generate probabilistic labels as to the suspiciousness of PowerShell scripts is shown according to an implementation of the disclosure. Each block illustrated in FIG. 2 represents an operation in the process 200 performed by, for example, the modules as shown in FIG. 1. It should be understood that not every operation illustrated in FIG. 2 is required. In fact, certain operations may be optional to complete aspects of the process 200. The discussion of the operations of process 200 may be done so with reference to any of the previously described figures.

Figure 3:
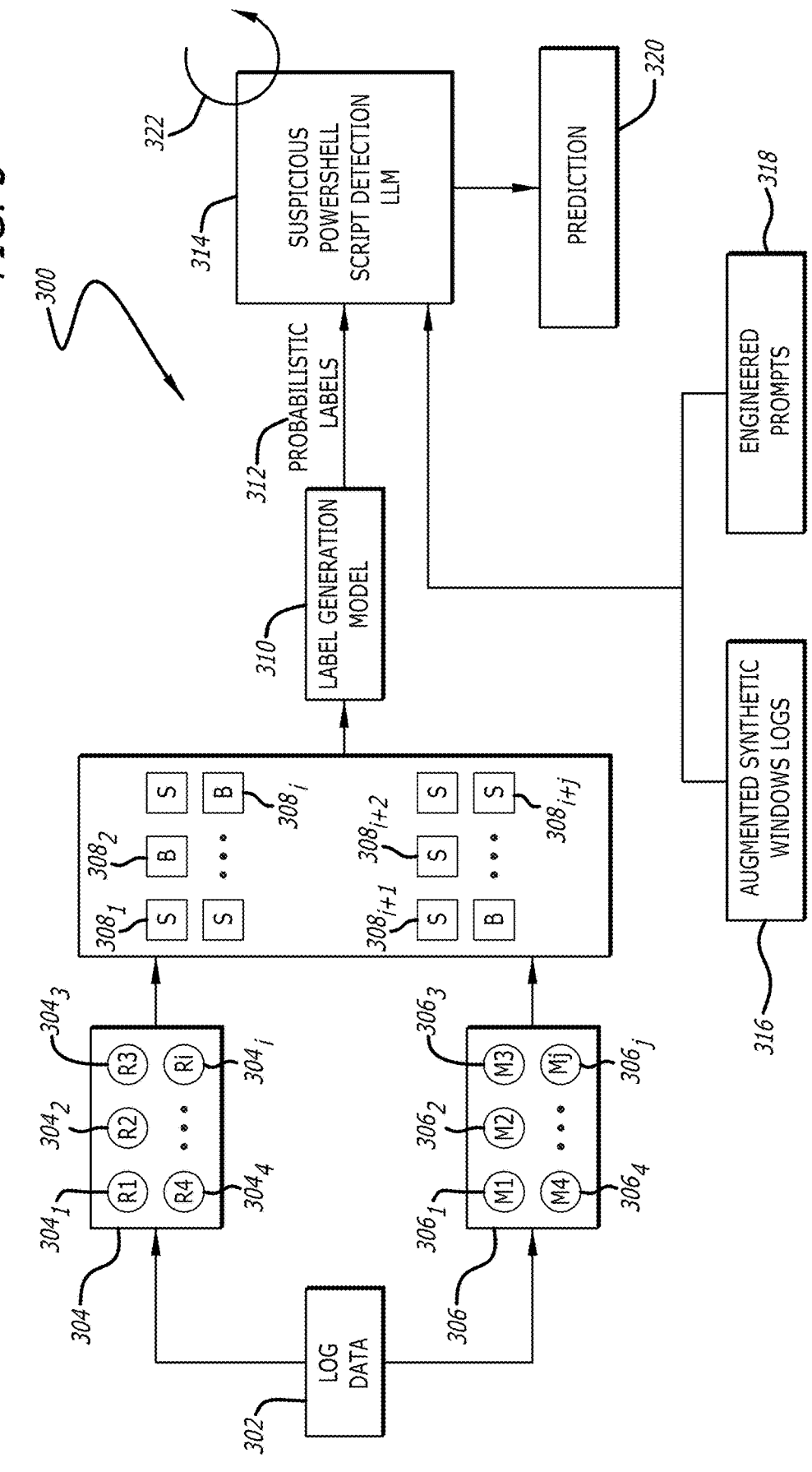
FIG. 3 is a block diagram illustrating a detailed diagrammatic flow of the generation of a dataset to be input into a label generation generative model according to an implementation of the disclosure.

The process 200 begins with obtaining historical customer Windows logs, applying security rules and models thereto resulting in a plurality of suspicious/benign determinations and providing the same to a label generation model (block 202). As shown in FIG. 3, a set of security rules and a set of models may each be applied to Windows Events including a PowerShell script, with each rule and model providing a suspicious/benign determination, which are provided to a label generation model. The label generation processes each Windows Event in view of the corresponding suspicious/benign determinations resulting in an initial probabilistic label for each PowerShell script indicating a probability of the script being suspicious (or benign), which are provided to a suspicious PowerShell script detection LLM (LLM) as "training input."

The process 200 also includes providing synthetic Windows logs comprising Windows Events including a PowerShell script and a label to a text augmentation model (generative model) (block 204). The label indicates whether the script is suspicious or benign. However, as discussed above, synthetic Windows Events of the synthetic Windows logs are typically lacking values for several fields of a standard Windows Event structure. Thus, the text augmentation model augments the synthetic Windows Events with additional values, optionally according to a predefined Windows Event structure. The augmented synthetic Windows logs and corresponding labels are provided to the suspicious PowerShell script detection LLM as "training input."

Further, the process 200 includes obtaining public datasets and documentation that is provided to a prompt engineering model (block 206). The prompt engineering model may perform text classification, tokenization, and decoding of any Windows Events having PowerShell scripts (which may be provided with "golden labels"). Additionally, the prompt engineering model may generate prompts for the suspicious PowerShell script detection LLM providing context for a re-training or fine-tuning process. The results of the prompt engineering model are provided to the suspicious PowerShell script detection LLM as "training input."

Following provision of the training input, a fine-tuning (or re-training) process is performed on the suspicious Power-Shell script detection LLM (block 208). The fine-tuning or re-training process may include processing the training input for a number of epochs by passing a batch of training input through the model to obtain predictions, computing a loss relative to the provided label through backpropagation, adjusting the model weights/parameters, and repeating for each batch over a series of epochs.

Additional fine-tuning or re-training may be performed on the suspicious PowerShell script detection LLM based on feedback and/or detection reports as described below (block 210). For example, the feedback and detection report are discussed in detail with respect to FIGS. 5-8.

Referring to FIG. 3, a block diagram illustrating a detailed diagrammatic flow of the generation of a dataset to be input into a label generation generative model is shown according to an implementation of the disclosure. The diagrammatic flow 300 illustrates the process by which security rules 304 and models 306 are applied to log data 302, e.g., historical customer Windows logs 102 of FIG. 1, resulting in suspiciousness determinations 308, which are analyzed by a label generation model 310 resulting in probabilistic labels 312. The probabilistic labels 312 are provided as input to the suspicious PowerShell script detection LLM 314 for re-training or fine-tuning (collectively, 322). The PowerShell script detection LLM 314 is configured to generate predictions of probabilistic labels 320, which may be in view of augmented synthetic Windows logs 316 and/or engineered prompts 318.

As should be understood, many of the components of FIG. 3 correspond to components discussed previously. For example, the augmented synthetic Windows logs 316 and the engineered prompts 318 correspond to the results of the text augmentation model 110 and the prompt engineering model 112, respectively. For purposes of clarity, the functionality or generation thereof will not be discussed here unless to provide additional or alternative functionality or implementations.

In further detail, the log data 302 may be historical customer Windows logs comprised of Windows Events including PowerShell scripts. The security rules 304, which may be comprised of rules 304₁-304ᵢ (where i≥1), are applied to the Windows Events with each of the security rules 304 resulting in a suspiciousness determination 308₁-308ᵢ, respectively. Similarly, the models 306, which may be comprised of models 306₁-306ⱼ (where j≥1), are applied to the Windows Events with each of the models resulting in a suspiciousness determination $308_{i+1}$-$308_{i+j}$, respectively. FIG. 3, the 'S' or 'B' provides an illustrative representation as to the suspiciousness determination being either suspicious or benign. In some implementations, the 'S' and 'B' are represented by other characters such as '1' and '0', etc. In some implementations, the suspiciousness determinations $308_i$-$308_{i+j}$ are arranged in a vector or matrix.

The suspiciousness determinations $308_i$-$308_{i+j}$ are then provided as input along with the Windows Event of the log data 302 to the label generation model 310, which may correspond to the label generation model 108 of FIG. 1. For example, the label generation model 310 may be a generative adversarial network (GAN) model and be configured to generate probabilistic labels 312 for each of the PowerShell scripts within the Windows Events indicating whether the likelihood that each of the PowerShell scripts are suspicious.

The suspicious PowerShell script detection LLM 314 may correspond to the suspicious PowerShell script detection LLM 114 of FIG. 1, and may be pre-trained on a large corpus of text data. The suspicious PowerShell script detection LLM 314 receives the probabilistic labels 312 and the log data 302 as input and undergoes re-training and/or fine-tuning processes 322. The suspicious PowerShell script detection LLM 314 may process the Windows Events within the log data 302 and generate probabilistic labels 320. As described above, a loss may be computed between the probabilistic label for a particular Windows Event generated by the suspicious PowerShell script detection LLM 314 and the probabilistic labeled for the same Windows Event generated by the label generation model 310, and the weights/parameters of the suspicious PowerShell script detection LLM 314 adjusted accordingly during a training or fine-tuning phase.

As noted above, vast amounts of log data 302 may be available typically lacks labeling as to whether a PowerShell script within a Windows Event included therein is suspicious or benign. The diagrammatic flow 300 illustrates one implementation for automatically generating probabilistic labels that may be used to re-train or fine-tune the suspicious PowerShell script detection LLM 314, which may be done in view of the augmented synthetic Windows logs 316 and the engineered prompts 318. Thus, the diagrammatic flow 300 provides an improvement in the field of machine learning, specifically related to the training and/or fine-tuning of models, by providing an example process for automatically generating probabilistic labels of potentially vast amounts of data. Further, the security rules 304 and models 306 may evolve (remove/add rules or models) such that the label generation model 310 generates probabilistic labels 312 for training purposes in view of a latest set of rules or models provided by a security analyst or other entity. This provides for an accurate process for generating the probabilistic labels 312 for training while accounting for new attacks, threats, detections, etc., by enabling the addition or removal of rules/models at any time with the probabilistic labels 312 reflecting the changes in security rules 304 and models 306.

Referring to FIG. 4, a flowchart illustrating example operations for generating probabilistic labels by a generative model from customer log data is shown according to an implementation of the disclosure. Each block illustrated in FIG. 4 represents an operation in the process 400 performed by, for example, the modules as shown in FIG. 1. It should be understood that not every operation illustrated in FIG. 4 is required. In fact, certain operations may be optional to complete aspects of the process 400. The discussion of the operations of process 400 may be done so with reference to any of the previously described figures.

The process 400 begins with obtaining historical log data comprised of Windows Events including PowerShell scripts (block 402). Operations of feature engineering, tokenization, and/or decoding may be performed with the results of such being provided to a set of security rules and/or models (blocks 404, 406). In some examples, the Windows Events may be tokenized, which may include parsing a Windows Event into tokens, e.g., individual terms, characters, or phrases. The delineation of tokens may be white spaces and punctuation. In some examples, features of the Windows Events may be extracted such as process names, event times, paths, file extensions, executables, decoded scripts (following decoding if needed), etc. In some examples, word embedding operations may be performed converting the tokens and/or features to numerical representations.

In some instances, the Windows PowerShell script may be encoded such that a decoding process is performed on the encoded Windows PowerShell script. The decoding operations may be dependent on the encoding technique with sample decoding techniques including identifying and reversing string manipulation (which may include defined terms comprising a larger term) such as by application of predefined rules or regular expressions (Regex), decompressing, decrypting, etc.

Referring still to FIG. 4, the application of security rules and/or models results in a set of suspiciousness determinations, e.g., a suspiciousness determination for each security rule/model, which may be arranged in a vector or matrix. It should be understood that such a vector or matrix of suspiciousness determinations is generated for each PowerShell script included in the historical log data.

The suspiciousness determinations are then provided as input to a label generation model, which generates probabilistic labels for each PowerShell script (block 408). As described above with respect to any of FIGS. 1-3, the probabilistic labels may then be used as training labels when re-training or fine-tuning a LLM such as the suspicious PowerShell script detection LLM 314 of FIG. 3.

Figure 5:
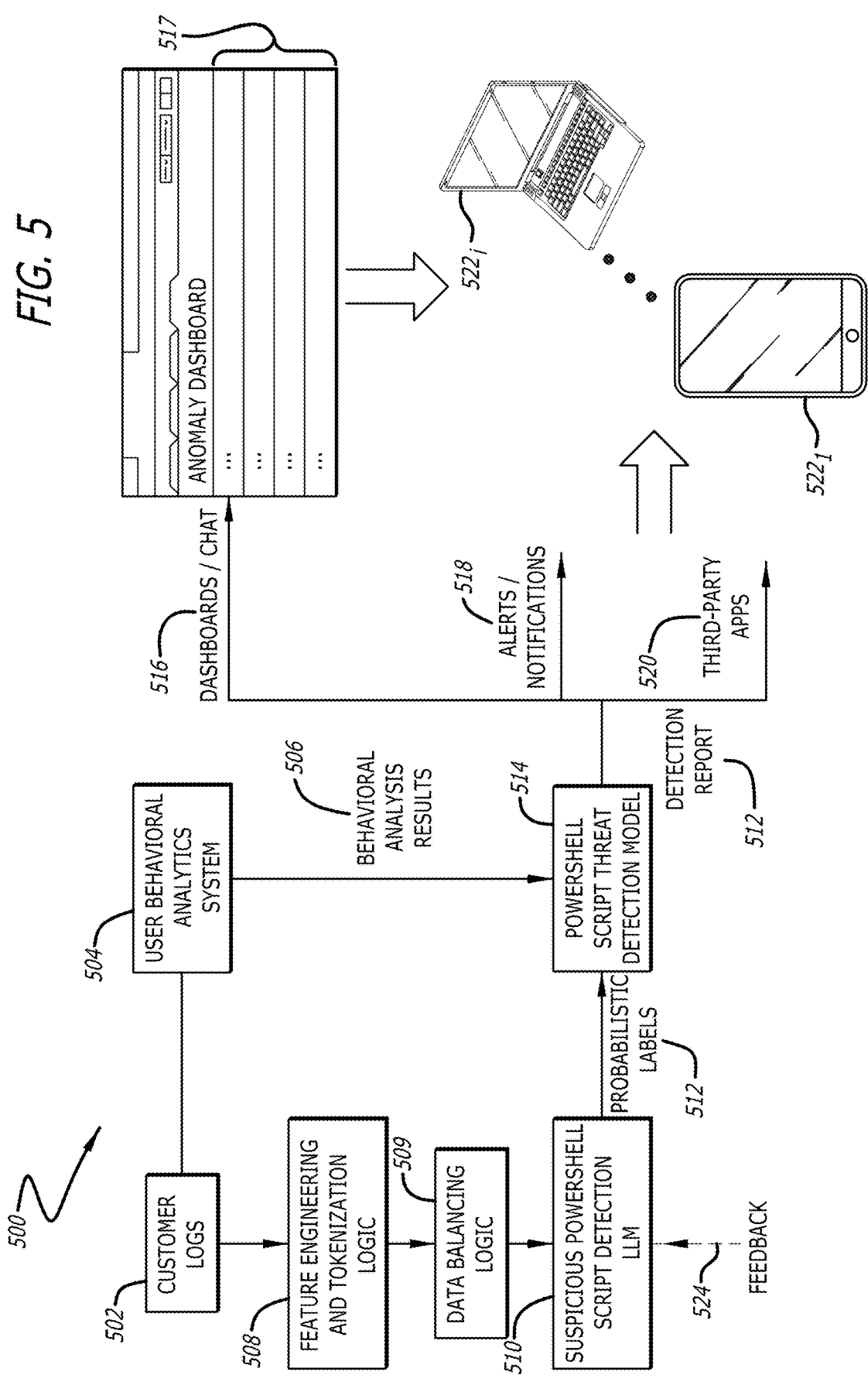
FIG. 5 is a block diagram illustrating a diagrammatic flow of deployment of a plurality of large learning models (LLMs) and an anomaly detection system to determine a suspiciousness prediction of and a threat detection report directed to a PowerShell script according to an implementation of the disclosure.

Referring to FIG. 5, a block diagram illustrating a diagrammatic flow of deployment of a plurality of large learning models (LLMs) and an anomaly detection system to determine a suspiciousness prediction and a threat detection report directed to a PowerShell script is shown according to an implementation of the disclosure. The diagrammatic flow 500 of FIG. 5 illustrates logic modules and results of processing of the logic modules that ultimately being the determination of one or more threat detection reports, which may form a part of dashboards, chat responses, alerts or notifications, and/or instructions to third-party applications. One aspect illustrated in the diagrammatic flow 500 is the determination of probabilistic labels 512 for the PowerShell scripts within the customer logs 502. Additionally, a second aspect is the generation of one or more threat detection reports that pertaining to one or more Windows Events and the PowerShell scripts included therein. The threat detection reports may be provided to the user in any of the methods illustrated.

In some examples, the customer logs 502 may be comprised of Windows Events including PowerShell scripts, where the Windows Events may be "current" events, which may mean that the events have not yet been analyzed for suspiciousness/maliciousness. Additionally, the customer logs 502 typically include Windows Events that occurred within a recent time period, such as an immediately prior 24 hour time period (however, this time period may be adjusted depending on the frequency at which the analyses illustrated in FIG. 5 are performed). In one example, customer logs 502 may represent a prior 24 hour time period and the operations of the user behavioral analytics system 504, feature engineering and tokenization logic 508, the suspicious PowerShell script detection LLM 510, and the PowerShell script threat detection model 514 are performed on a daily basis.

Now referring to FIG. 5 in more detail, the customer logs 502 are shown are being provided to the user behavioral analytics system 504 and the feature engineering and tokenization logic 508. As discussed above, the user behavioral analytics system 504 may be configured to perform user and entity profiling procedures on Windows Event and PowerShell scripts included within the customer logs 502. For example, the user behavioral analytics system 504 may apply baselined behavioral models and rules to the Windows Events in combination with additional data such as time-series data and detect anomalous behaviors, actions, or patterns in view of a normal baseline of entity behavior, with anomalous behaviors, actions, or patterns being potentially indicative of a cyber-threat or cyber-attack. The behavioral analysis results 506 are provided to a PowerShell script threat detection model 514.

Additionally, the customer logs 502 are provided to a feature engineering and tokenization logic 508 that may be configured to perform feature engineering, feature extraction, decoding, and/or tokenization operations as discussed above. The customer logs 502 may be in an encoded and/or decoded state including any features and/or tokens and are provided to a suspicious PowerShell script detection LLM 510, which may be configured to determine probabilistic labels 512 for each of the PowerShell scripts included within the customer logs 502 as described above. As shown, the probabilistic labels 512 are also provided to the PowerShell script threat detection model 514. In some implementations, the extracted features as well as the decoded customer logic 502 may be provided to a data balancing logic 509 that is configured to balance the ratio of benign and suspicious samples included within the customer logs 502. The data balancing logic 509 may include a generative synthesizer such as a conditional generative adversarial network (CT-GAN) ir a tabular variational autoencoder (TVAE), which are applied to generate balanced samples to tackle unbalanced data.

The PowerShell script threat detection model 514 may be a detection machine learning model ("detection model") configured to classify the PowerShell scripts of the customer logs 502 as suspicious or benign by associating the probabilistic labels 512 provided by the suspicious Powershell script detection LLM 510 with the behavioral analysis results provided by the user behavioral analytics system 504. It should be understood that in other implementations, additional classification options may be utilized such as benign, suspicious, or malicious. Examples of detection models may include, but are not limited or restricted to, logistic regression models, SVMs, neural networks (CNNs or RNNs), Isolation Forest models, autoencoders, etc.

In some implementations, upon a generation of a detection report, one or more graphical user interfaces (GUIs), e.g., a dashboard or chat interface 516, are generated to display anomaly information, such as a listing of threats detected, suspicious or malicious PowerShell scripts, and/or Windows Events including a suspicious or malicious PowerShell script (listing 517). In some instances, such as following a determination that a PowerShell script is suspicious or malicious, such may be emphasized in the listing 517 (e.g., prioritized at the top of the listing 517, provided in a bold or colored manner, provided with a flag, etc.), an alert/notification 518 may be generated and provided to a user such as a SOC analyst via one or more network devices 522₁-522ᵢ, and/or generate remedial instructions that are provided to third-party apps 520 (e.g., MICROSOFT OUT-LOOK®). In fact, the remedial instructions may cause specific, automated remedial actions such as deleting or flagging an email, deleting a file, executing a file within a virtual machine to determine actions or behaviors caused by the file, etc. Thus, the remedial instructions improve the processing of a computer by automatically taking remedial action.

FIG. 5 also illustrates that feedback 524 may be provided from users and/or subject matter experts (SMEs) to the suspicious PowerShell script detection LLM 510 and comprise confirmations or corrections of determinations by the user behavioral analytics system 504, and optionally, of the suspicious PowerShell script detection LLM 510. For instance, false positives and/or true positives may be flagged for re-training and/or fine-tuning via user input to an anomaly dashboard 516. Additionally, context as to the confirmation or correction of a determination may be provided, with may include portions of the behavioral analysis results 506.

In some instances, either of the suspicious PowerShell script detection LLM and/or the PowerShell script threat detection model may be re-trained and/or fine-tuned over time using entity-specific data that customizes the LLM or detection model. Specifically, as the suspicious PowerShell script detection LLM or the PowerShell script threat detection model may be pre-trained on a large corpus of text data or other training dataset that may not be associated with the specific entity (e.g., a "customer," which may refer to an individual or corporation), the LLM or detection model as initially pre-trained may be referred to as "base models" and as the LLM or detection model undergoes re-training and/or fine-tuning processes using customer-specific data, the LLM or detection model may be referred to as being customized.

Referring to FIG. 6, a flowchart illustrating example operations for generating probabilistic labels by a generative model from customer log data is shown according to an implementation of the disclosure. Each block illustrated in FIG. 6 represents an operation in the process 600 performed by, for example, the modules as shown in FIGS. 1 and 5. It should be understood that not every operation illustrated in FIG. 6 is required. In fact, certain operations may be optional to complete aspects of the process 600. The discussion of the operations of process 600 may be done so with reference to any of the previously described figures.

The process 600 begins with obtaining current customer log data comprised of Windows Events including PowerShell scripts that are to be analyzed for indications of being cyber-threats (block 602). The process 600 includes two separate paths (block 604 and blocks 606, 608) that both provide output to a PowerShell script threat detection model as discussed above. It should be understood that the two separate paths may be performed in parallel, serially, or concurrently (at least partially overlapping in time).

Regarding one path, the customer logs may be provided to user behavioral analytics system as input with the user behavioral analytics system configured to perform one or more detection procedures on the Windows Event and PowerShell scripts included therein, and optionally, associated data (block 604). The user behavioral analytics system may apply baselined behavioral models and rules to the Windows Events in combination with additional data such as time-series data. The baselined behavioral models and rules may establish a normal baseline of entity behavior (where an entity may be an individual, a network device, an enterprise department, particular software applications, etc.) and detect anomalous behaviors, actions, or patterns from the Windows Events and additional time-series data. The anomalous behaviors, actions, or patterns may be indicative of various cyber-threats such as phishing, ransomware, malware, man-in-the-middle (MitM) attacks, code injection, data breaches, etc.

Regarding the other path, feature engineering/extraction, tokenization, and/or decoding operations may be performed on the Windows Events and PowerShell scripts as discussed above (block 606). The features and/or Windows Events including the PowerShell scripts may then be provided to a suspicious PowerShell script detection model that is configured to determine probabilistic labels of the suspiciousness of the PowerShell scripts (block 608).

The results of the anomaly detection and the probabilistic labels along with the customer logs (Windows Events) are then provided to a PowerShell script threat detection model that is configured to generate a threat detection report that details the suspiciousness and/maliciousness of the PowerShell scripts (block 610). Finally, one or more of a dashboard, alert/notification, and/or remedial instructions may be generated and provided to a user via one or more network devices and/or software applications, which cause the automated performance of remedial actions (block 612).

Figure 7:
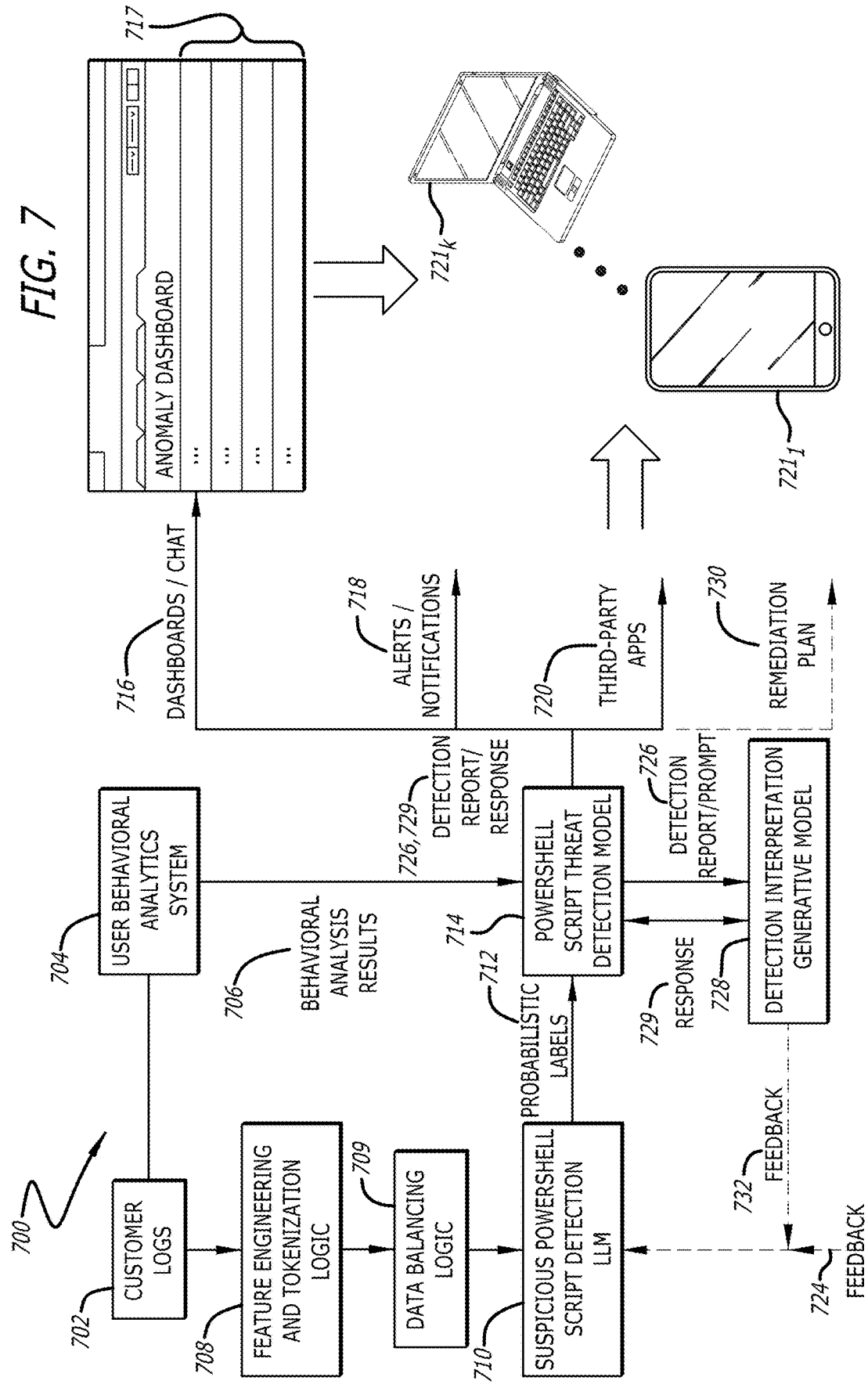
FIG. 7 is a block diagram illustrating a diagrammatic flow of deployment of a large learning models (LLM), a user behavioral analytics system, and a PowerShell script threat detection model to determine a suspiciousness prediction of and a threat detection report directed to a PowerShell script and further a generative model configured to generate an interpretation of the threat detection report according to an implementation of the disclosure.

Referring to FIG. 7, a block diagram illustrating a diagrammatic flow of deployment of a large learning models (LLM), a user behavioral analytics system, and a PowerShell script threat detection model to determine a suspiciousness prediction of and a threat detection report directed to a PowerShell script and further a generative model configured to generate an interpretation of the threat detection report is shown according to an implementation of the disclosure. As should be understood, many of the components of FIG. 7 correspond to components discussed previously. For example, the customer logs 702, the user behavioral analytics system 704, the behavioral analysis results 706, the feature engineering and tokenization logic 708, the suspicious PowerShell script detection LLM 710, the probabilistic labels 712, and the PowerShell script threat detection model 714 each have the same functionality or are generated in the manner as the component of FIG. 5 having the same name. For purposes of clarity, the functionality or generation thereof will not be discussed here unless to provide additional or alternative functionality or implementations.

The diagrammatic flow 700 of FIG. 7 differs from that of FIG. 5 in that the diagrammatic flow 700 includes a detection interpretation (generative) model 728, which may be configured to receive a detection report 726 and a prompt 727 and generate feedback 732 and/or a response 729, which may include a natural language interpretation of at least a portion of the detection report 726 (e.g., a natural language statement indicating why a particular script was classified as suspicious or malicious). The response 729 may also include a remediation plan 730. The detection report 726 may be provided to the user as part of the remediation plan 730 (or in some cases may form the entirety of the remediation plan 730). The feedback 732 may differ from the feedback 724 in that the former may provide additional, natural language context that may be used in the re-training and/or fine-tuning of the suspicious PowerShell script detection LLM 710. The remediation plan 730 may also be referred to as a detection interpretation that provides a natural language description of the anomalies detected by the anomaly detection system 704, the suspicious PowerShell scripts identified by the suspicious PowerShell script detection LLM and/or the PowerShell script threat detection model. In some examples, the detection interpretation (generative) model 728 may deploy a chain-of-thought (CoT) approach according to a predetermined script provided to the detection interpretation (generative) model 728 along with the detection report 726.

An example response 729 may be a summary of the detection report 726 and may include the following:

Suspicious PowerShell Script Detected

On [device name] SesTestWin2012.SesTestDomain.local, user splunker (with ID SESTESTWIN2012\splunker) executed a suspicious PowerShell script. The script was detected by our PowerShell Detection Model and has been flagged as medium-risk.

The script in question cloned a repository from GitHub (https://github.com/dafthack/MailSniper.git) to C: \\ tools\\MailSniper. This activity is associated with the user ID SESTESTWIN2012\splunker and a file named runas.exe located at C:\\Windows\\System32\\runas.exe.

Related Observables

* The process "runas.exe" was executed.

* The PowerShell script (powershell.exe) was used by the actor splunker.

* The username of the victim is splunker.

* The device hosting this activity is SesTest Win2012.SesTestDomain.local.

* Given the user peer group and domain (user domain: SESTESTWIN2012), anomalies were detected by ML model (model name: Unusual Volume of Authentication Failure Events per User Model) on device (device name: SesTestWin2012.SesTestDomain.local) on date Apr. 26, 2024.

* Given the user peer group, the anomalies were detected by UBA's ML model (model name: Unusual Volume of Data Uploaded per User Model) on both daily and weekly basis. The anomalies were detected on Apr. 26, 2024, Apr. 27, 2024 and Apr. 28, 2024.

Additional Context

This activity is part of a larger attack chain, which includes phases such as Installation, Command and Control, and Exploitation. Our model detects that the script execution is associated with the MailSniper repository on GitHub, which may indicate malicious intentions.

Risk Assessment

The risk level for this script execution has been calculated to be medium, based on our analysis of Windows Event 4688. The confidence level in this assessment is 61%. This event has been enriched with additional context and threat intelligence from various sources.

Attack Chain:

* Installation (MITRE ATT&CK T1213): Cloned the MailSniper repository from GitHub. The actor has executed a PowerShell command to clone a repository from GitHub, indicating an attempt to obtain or exfiltrate sensitive information.

* Command and Control: Used PowerShell to execute the script.

* Exploitation: Attempted to obtain or exfiltrate sensitive information.

Referring to FIG. 8, a flowchart illustrating example operations for generating a threat detection report is shown according to an implementation of the disclosure. Each block illustrated in FIG. 8 represents an operation in the process 800 performed by, for example, the modules as shown in FIG. 1, 5, or 7. It should be understood that not every operation illustrated in FIG. 8 is required. In fact, certain operations may be optional to complete aspects of the process 800. The discussion of the operations of process 800 may be done so with reference to any of the previously described figures.

The process 800 begins with generating a detection report by a PowerShell script threat detection model (block 802). The detection report, or a portion thereof, may be used as feedback to a suspicious PowerShell script detection LLM for re-training and/or fine-tuning (block 804). Additionally, the detection report may be provided as input to a detection interpretation (generative) model that is configured to provide a natural language explanation of the suspiciousness of one or more PowerShell scripts included within customer logs and generate a remediation plan or instructions (block 806). The detection report and/or interpretation may be provided as a display on a graphical user interface (block 808).

In some examples, the remediation instructions may be provided automatically to software applications (or an operating system) (block 810). The remediation instructions may be configured for automated execution and/or to cause automated action that will either remove a suspicious or malicious file (e.g., a PowerShell script), delete an email or other network traffic that was the source of a suspicious or malicious PowerShell script into an enterprise network or on a network device, block an internet protocol (IP) address or email address at an email client, a firewall, or a router, etc.

Figure 9:
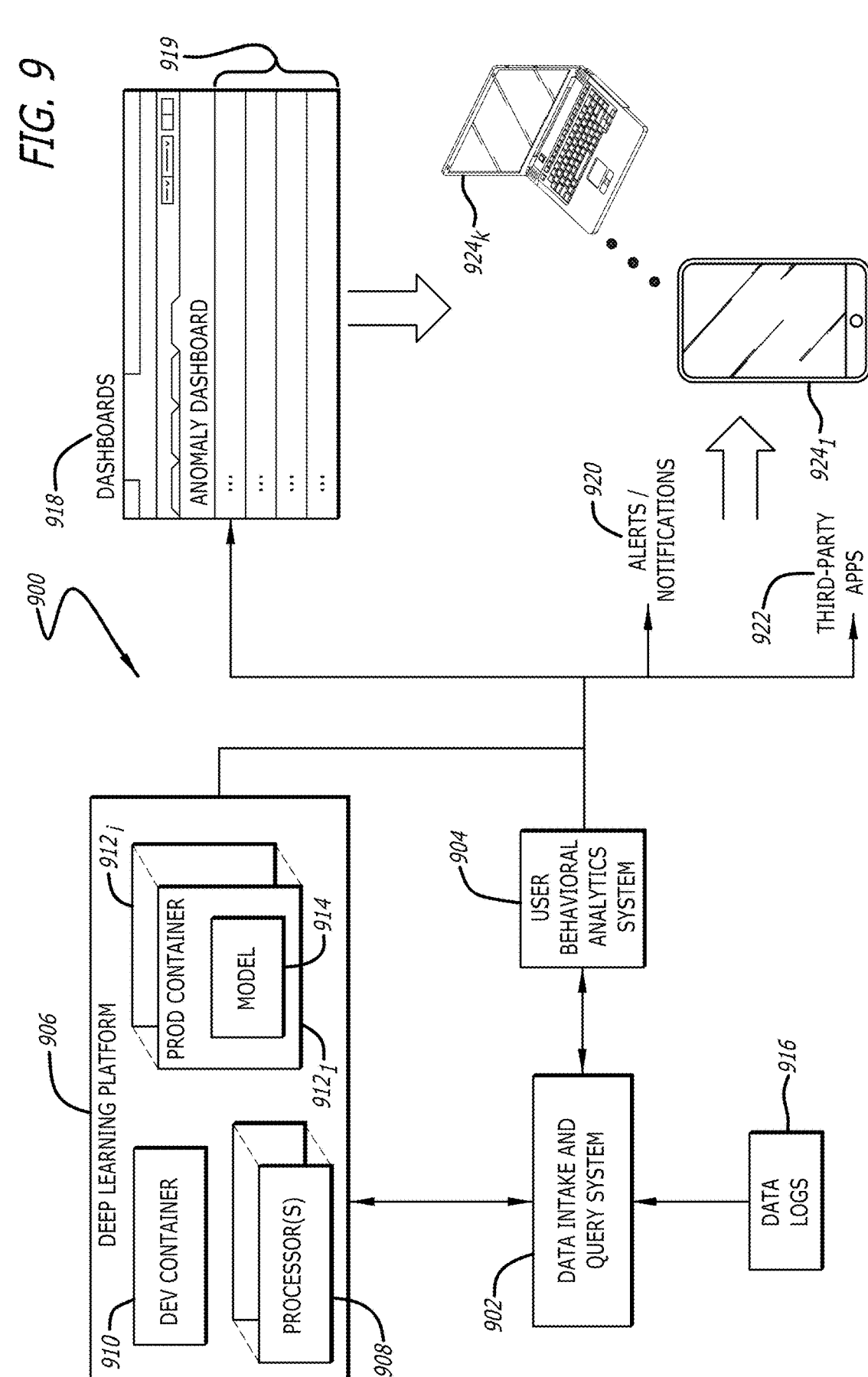
FIG. 9 is a block diagram illustrating a deployment configuration of a networked environment including a plurality of models processing in a deep learning platform and other network components according to an implementation of the disclosure.

Referring to FIG. 9, a block diagram illustrating a deployment configuration of a networked environment including a plurality of models processing in a deep learning platform and other network components is shown according to an implementation of the disclosure.

The networked environment 900 includes several components including hardware and software that are communicatively coupled through a network, namely the internet, which may be a public cloud or private cloud for example (not shown). As illustrated, the networked environment 900 includes a data intake and query system 902 communicatively coupled to an anomaly detection system 904 and a deep learning platform 906, which may include a plurality of processors 908, multiple containers such as a DEV container 910 and a plurality of PROD containers $912_1$-$912_i$ (collectively or individually "912"). Each of the PROD containers may include one or more trained machine learning models 914, such as those discussed herein.

The term container may refer to a standalone, executable software package configured to run one or more applications. For example, the DEV container 910 may be a software package configured to run on cloud computing resources and perform machine learning model training. Additionally, the PROD containers 912 may be software packages configured to run on cloud computing resources and execute a machine learning model on input provided by the data intake and query system 902. For example and as discussed herein, the data intake and query system 902 may provide log data to a PROD container 912 that is configured to deploy a trained machine learning model resulting in the generation of probabilistic training labels indicative of the suspiciousness of scripts within the log data or of a detection report indicating suspicious or maliciousness of scripts within the log data, and optionally related computing activity or occurrences related to the script. As an example, the data intake and query system 902 may execute a query that causes performance of operations to retrieve customer log data from a datastore (not shown) and initiate, e.g., begin, a threat detection analysis by providing the customer log data to the anomaly detection system and deploying of a machine learning model to generate probabilistic labels for the scripts within the customer log data.

The analyses performed by any of the data intake and query system 902, the user behavioral analytics system 904, or the deep learning platform 906 may result in certain actions performed automatically including generation and display of a dashboard 918, generation and display or transmission of alerts 920, and/or generation of instructions for or actions performed on behalf of third-party application 922 (e.g., an email client such as the email client OUTLOOK® provided by Microsoft Corporation) which may be displayed or be performed on the network device $924_1$-$924_k$.

Referring to FIG. 10, a flowchart illustrating an example operations for performing a phishing detection methodology is shown according to an implementation of the disclosure. The example process 1000 can be implemented, for example, by a computing device that comprises a processor and a non-transitory computer-readable medium. The non-transitory computer readable medium can be storing instructions that, when executed by the processor, can cause the processor to perform the operations of the illustrated process 1000. Alternatively or additionally, the process 1000 can be implemented using a non-transitory computer-readable medium storing instructions that, when executed by one or more processors, case the one or more processors to perform the operations of the process 1000 of FIG. 10.

Each block illustrated in FIG. 10 represents an operation in the process 1000. It should be understood that not every operation illustrated in FIG. 10 is required. In fact, certain operations may be optional to complete aspects of the process 1000. The discussion of the operations of process 1000 may be done so with reference to any of the previously described figures. The process 1000 begins with an operation of obtaining historical log data including a plurality of logs being recordings of activities or occurrences during operation of a network device, wherein each recording includes or involves a script or an executable file (block 1002). An additional operation includes obtaining synthetic log data including a plurality of synthetic logs being synthetic data representative of activities or occurrences during operation of the network device, wherein the synthetic data include or involve synthetic scripts or synthetic executable files that include a label indicating whether each synthetic script or synthetic executable file is suspicious or benign (block 1004). Subsequently, a first generative machine learning model may be deployed where the historical log data and synthetic log data are provided as input, wherein the first generative machine learning model is trained and configured to generate training probabilistic labels indicating a first level of suspiciousness for each script or executable file of the historical log data (block 1006).

An additional operation includes performing a re-training process or a fine-tuning process on a large language model (LLM) formed of operations including: processing a batch of the plurality of logs of the historical log data to generate second probabilistic labels indicating a second level of suspiciousness for each script or executable file of the batch of the plurality of logs, determining a loss between the second probabilistic labels and corresponding labels of the training probabilistic labels, and adjusting weights or parameters of the LLM according to the loss (block 1008). The LLM may then be stored following implementation of the re-training or the fine-tuning process (block 1010).

The script or the executable of each recording of the historical log data may be a PowerShell script. The recordings of the historical log data may be Windows Events. The process 1000 may further comprising an operation of deploying the LLM by providing additional log data including a second plurality of logs being additional recordings of activities or occurrences during subsequent operation of the network device, wherein each recording includes or involves an additional script or an additional executable file. An additional operation of the process 1000 may further comprise, prior to deploying the first generative machine learning model, applying a set of security rules or a set of machine learning models to the recordings of activities or occurrences during operation of the network device resulting in a set of suspiciousness determinations, wherein the set of suspiciousness determinations are provided as part of the input. Yet another operation of the process 1000 may further comprise, prior to deploying the first generative machine learning model, performing a data balancing procedure such that the first generative machine learning model is provided a dataset that is more balanced between benign and suspicious examples than the historical log data. The process 100 may also comprise performing an additional re-training procedure on the first generative machine learning model based on feedback received as user input.

Referring to FIG. 11, a flowchart illustrating an example operations for performing a phishing detection methodology is shown according to an implementation of the disclosure. The example process 1100 can be implemented, for example, by a computing device that comprises a processor and a non-transitory computer-readable medium. The non-transitory computer readable medium can be storing instructions that, when executed by the processor, can cause the processor to perform the operations of the illustrated process 1100. Alternatively or additionally, the process 1100 can be implemented using a non-transitory computer-readable medium storing instructions that, when executed by one or more processors, case the one or more processors to perform the operations of the process 1100 of FIG. 11.

Each block illustrated in FIG. 11 represents an operation in the process 1100. It should be understood that not every operation illustrated in FIG. 11 is required. In fact, certain operations may be optional to complete aspects of the process 1100. The discussion of the operations of process 1100 may be done so with reference to any of the previously described figures. The process 1100 begins with an operation of obtaining a plurality of logs being recordings of activities or occurrences during operation of a network device, wherein each recording includes or involves a script or an executable file (block 1102).

Additionally, feature engineering may be performed on a first script or a first executable file of a first recording within the plurality of logs resulting in extraction of a set of features and a probabilistic label for the first script or the first executable file is generated through deployment of a large language model (LLM) configured to receive the set of features as input, wherein the probabilistic label indicates whether the LLM inferred that the first script of the first executable file is benign or suspicious (blocks 1104, 1106).

A maliciousness determination of the first script or the first executable file may then be generated through deployment of a machine learning model configured to receive the probabilistic label and results of a user behavioral analysis of the plurality of logs and an alert or graphical user interface may be generated that displays the malicious determination to a user (blocks 1108, 1110).

In some implementations, each recording of the plurality of logs includes a PowerShell script, and the first script is a first PowerShell script. In some implementations, the recordings of the plurality of logs are Windows Events, wherein the Windows Events are activities or occurrences during operation of one or more network devices and that are recorded by an operating system or other logging/recording application. In some instances, generating the results of the user behavioral analysis includes deploying a user behavioral analytics system configured to receive the plurality of logs and apply a baselined behavioral model or rules to the recordings resulting in detection of anomalous behaviors, anomalous actions, or anomalous patterns in view of a normal baseline of entity behavior. Additionally, the anomalous behaviors, the anomalous actions, or the anomalous patterns may be indicative of a cyber-threat or cyber-attack.

The process 1100 may further comprise an operation of generating, by a generative model, a natural language summary of the malicious determination that was generated by the machine learning model. In some examples, the maliciousness determination indicates that the first script is malicious, and an additional operations may include receiving feedback from the user via the graphical user interface indicating that either the maliciousness determination or an aspect of the results of the user behavioral analysis is a false positive, and performing a retraining procedure on the LLM based on the user feedback.

The process 1100 may further comprise an operation of performing an automated remedial action including one of: deleting or flagging an email associated with the script or the executable file, deleting the script or the executable file, executing the script or the executable file within a virtual machine to determine actions or behaviors caused upon execution of the script or the executable file.

Entities that operate computing environments need information about their computing environments. For example, an entity may need to know the operating status of the various computing resources in the entity's computing environment, so that the entity can administer the environment, including performing configuration and maintenance, performing repairs or replacements, provisioning additional resources, removing unused resources, or addressing issues that may arise during operation of the computing environment, among other examples. As another example, an entity can use information about a computing environment to identify and remediate security issues that may endanger the data, users, and/or equipment in the computing environment. As another example, an entity may be operating a computing environment for some purpose (e.g., to run an online store, to operate a bank, to manage a municipal railway, etc.) and may want information about the computing environment that can aid the entity in understanding whether the computing environment is operating efficiently and for its intended purpose.

Collection and analysis of the data from a computing environment can be performed by a data intake and query system such as is described herein. A data intake and query system can ingest and store data obtained from the components in a computing environment, and can enable an entity to search, analyze, and visualize the data. Through these and other capabilities, the data intake and query system can enable an entity to use the data for administration of the computing environment, to detect security issues, to understand how the computing environment is performing or being used, and/or to perform other analytics.

Figure 12:
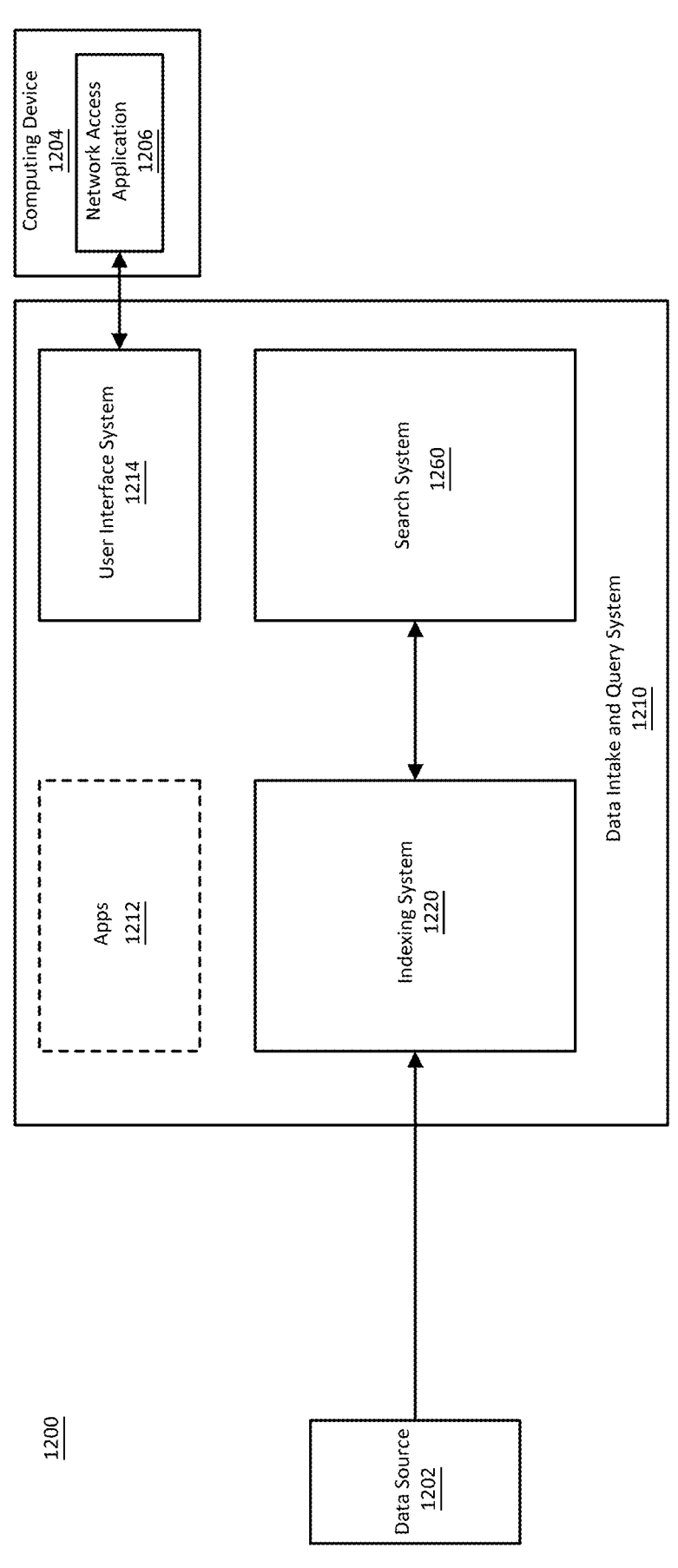
FIG. 12 is a block diagram illustrating an example computing environment that includes a data intake and query system according to an implementation of the disclosure.

FIG. 12 is a block diagram illustrating an example computing environment 1200 that includes a data intake and query system 1210. The data intake and query system 1210 obtains data from a data source 1202 in the computing environment 1200 and ingests the data using an indexing system 1220. A search system 1260 of the data intake and query system 1210 enables users to navigate the indexed data. Though drawn with separate boxes in FIG. 12, in some implementations the indexing system 1220 and the search system 1260 can have overlapping components. A computing device 1204, running a network access application 1206, can communicate with the data intake and query system 1210 through a user interface system 1214 of the data intake and query system 1210. Using the computing device 1204, a user can perform various operations with respect to the data intake and query system 1210, such as administration of the data intake and query system 1210, management and generation of "knowledge objects," (user-defined entities for enriching data, such as saved searches, event types, tags, field extractions, lookups, reports, alerts, data models, workflow actions, and fields), initiating of searches, and generation of reports, among other operations. The data intake and query system 1210 can further optionally include apps 1212 that extend the search, analytics, and/or visualization capabilities of the data intake and query system 1210.

The data intake and query system 1210 can be implemented using program code that can be executed using a computing device. A computing device is an electronic device that has a memory for storing program code instructions and a hardware processor for executing the instructions. The computing device can further include other physical components, such as a network interface or components for input and output. The program code for the data intake and query system 1210 can be stored on a non-transitory computer-readable medium, such as a magnetic or optical storage disk or a flash or solid-state memory, from which the program code can be loaded into the memory of the computing device for execution. "Non-transitory" means that the computer-readable medium can retain the program code while not under power, as opposed to volatile or "transitory" memory or media that requires power in order to retain data.

In various examples, the program code for the data intake and query system 1210 can be executed on a single computing device, or execution of the program code can be distributed over multiple computing devices. For example, the program code can include instructions for both indexing and search components (which may be part of the indexing system 1220 and/or the search system 1260, respectively), which can be executed on a computing device that also provides the data source 1202. As another example, the program code can be executed on one computing device, where execution of the program code provides both indexing and search components, while another copy of the program code executes on a second computing device that provides the data source 1202. As another example, the program code can be configured such that, when executed, the program code implements only an indexing component or only a search component. In this example, a first instance of the program code that is executing the indexing component and a second instance of the program code that is executing the search component can be executing on the same computing device or on different computing devices.

The data source 1202 of the computing environment 1200 is a component of a computing device that produces machine data. The component can be a hardware component (e.g., a microprocessor or a network adapter, among other examples) or a software component (e.g., a part of the operating system or an application, among other examples). The component can be a virtual component, such as a virtual machine, a virtual machine monitor (also referred as a hypervisor), a container, or a container orchestrator, among other examples. Examples of computing devices that can provide the data source 1202 include personal computers (e.g., laptops, desktop computers, etc.), handheld devices (e.g., smart phones, tablet computers, etc.), servers (e.g., network servers, compute servers, storage servers, domain name servers, web servers, etc.), network infrastructure devices (e.g., routers, switches, firewalls, etc.), and "Internet of Things" devices (e.g., vehicles, home appliances, factory equipment, etc.), among other examples. Machine data is electronically generated data that is output by the component of the computing device and reflects activity of the component. Such activity can include, for example, operation status, actions performed, performance metrics, communications with other components, or communications with users, among other examples. The component can produce machine data in an automated fashion (e.g., through the ordinary course of being powered on and/or executing) and/or as a result of user interaction with the computing device (e.g., through the user's use of input/output devices or applications). The machine data can be structured, semi-structured, and/or unstructured. The machine data may be referred to as raw machine data when the data is unaltered from the format in which the data was output by the component of the computing device. Examples of machine data include operating system logs, web server logs, live application logs, network feeds, metrics, change monitoring, message queues, and archive files, among other examples.

As discussed in greater detail below, the indexing system 1220 obtains machine date from the data source 1202 and processes and stores the data. Processing and storing of data may be referred to as "ingestion" of the data. Processing of the data can include parsing the data to identify individual events, where an event is a discrete portion of machine data that can be associated with a timestamp. Processing of the data can further include generating an index of the events, where the index is a data storage structure in which the events are stored. The indexing system 1220 does not require prior knowledge of the structure of incoming data (e.g., the indexing system 1220 does not need to be provided with a schema describing the data). Additionally, the indexing system 1220 retains a copy of the data as it was received by the indexing system 1220 such that the original data is always available for searching (e.g., no data is discarded, though, in some examples, the indexing system 1220 can be configured to do so).

The search system 1260 searches the data stored by the indexing 1220 system. As discussed in greater detail below, the search system 1260 enables users associated with the computing environment 1200 (and possibly also other users) to navigate the data, generate reports, and visualize search results in "dashboards" output using a graphical interface. Using the facilities of the search system 1260, users can obtain insights about the data, such as retrieving events from an index, calculating metrics, searching for specific conditions within a rolling time window, identifying patterns in the data, and predicting future trends, among other examples. To achieve greater efficiency, the search system 1260 can apply map-reduce methods to parallelize searching of large volumes of data. Additionally, because the original data is available, the search system 1260 can apply a schema to the data at search time. This allows different structures to be applied to the same data, or for the structure to be modified if or when the content of the data changes. Application of a schema at search time may be referred to herein as a late-binding schema technique.

The user interface system 1214 provides mechanisms through which users associated with the computing environment 1200 (and possibly others) can interact with the data intake and query system 1210. These interactions can include configuration, administration, and management of the indexing system 1220, initiation and/or scheduling of queries that are to be processed by the search system 1260, receipt or reporting of search results, and/or visualization of search results. The user interface system 1214 can include, for example, facilities to provide a command line interface or a web-based interface.

Users can access the user interface system 1214 using a computing device 1204 that communicates with data intake and query system 1210, possibly over a network. A "user," in the context of the implementations and examples described herein, is a digital entity that is described by a set of information in a computing environment. The set of information can include, for example, a user identifier, a username, a password, a user account, a set of authentication credentials, a token, other data, and/or a combination of the preceding. Using the digital entity that is represented by a user, a person can interact with the computing environment 1200. For example, a person can log in as a particular user and, using the user's digital information, can access the data intake and query system 1210. A user can be associated with one or more people, meaning that one or more people may be able to use the same user's digital information. For example, an administrative user account may be used by multiple people who have been given access to the administrative user account. Alternatively or additionally, a user can be associated with another digital entity, such as a bot (e.g., a software program that can perform autonomous tasks). A user can also be associated with one or more entities. For example, a company can have associated with it a number of users. In this example, the company may control the users' digital information, including assignment of user identifiers, management of security credentials, control of which persons are associated with which users, and so on.

The computing device 1204 can provide a human-machine interface through which a person can have a digital presence in the computing environment 1200 in the form of a user. The computing device 1204 is an electronic device having one or more processors and a memory capable of storing instructions for execution by the one or more processors. The computing device 1204 can further include input/output (I/O) hardware and a network interface. Applications executed by the computing device 1204 can include a network access application 1206, such as a web browser, which can use a network interface of the client computing device 1204 to communicate, over a network, with the user interface system 1214 of the data intake and query system 1210. The user interface system 1214 can use the network access application 1206 to generate user interfaces that enable a user to interact with the data intake and query system 1210. A web browser is one example of a network access application. A shell tool can also be used as a network access application. In some examples, the data intake and query system 1210 is an application executing on the computing device 1206. In such examples, the network access application 1206 can access the user interface system 1214 without going over a network.

The data intake and query system 1210 can optionally include apps 1212. An app of the data intake and query system 1210 is a collection of configurations, knowledge objects (a user-defined entity that enriches the data in the data intake and query system 1210), views, and dashboards that may provide additional functionality, different techniques for searching the data, and/or additional insights into the data. The data intake and query system 1210 can execute multiple applications simultaneously. Example applications include an information technology service intelligence application, which can monitor and analyze the performance and behavior of the computing environment 1200, and an enterprise security application, which can include content and searches to assist security analysts in diagnosing and acting on anomalous or malicious behavior in the computing environment 1200.

Though FIG. 12 illustrates only one data source, in practical implementations, the computing environment 1200 contains many data sources spread across numerous computing devices. The computing devices may be controlled and operated by a single entity. For example, in an "on the premises" or "on-prem" implementation, the computing devices may physically and digitally be controlled by one entity, meaning that the computing devices are in physical locations that are owned and/or operated by the entity and are within a network domain that is controlled by the entity.

In an entirely on-prem implementation of the computing environment 1200, the data intake and query system 1210 executes on an on-prem computing device and obtains machine data from on-prem data sources. An on-prem implementation can also be referred to as an "enterprise" network, though the term "on-prem" refers primarily to physical locality of a network and who controls that location while the term "enterprise" may be used to refer to the network of a single entity. As such, an enterprise network could include cloud components.

"Cloud" or "in the cloud" refers to a network model in which an entity operates network resources (e.g., processor capacity, network capacity, storage capacity, etc.), located for example in a data center, and makes those resources available to users and/or other entities over a network. A "private cloud" is a cloud implementation where the entity provides the network resources only to its own users. A "public cloud" is a cloud implementation where an entity operates network resources in order to provide them to users that are not associated with the entity and/or to other entities. In this implementation, the provider entity can, for example, allow a subscriber entity to pay for a subscription that enables users associated with subscriber entity to access a certain amount of the provider entity's cloud resources, possibly for a limited time. A subscriber entity of cloud resources can also be referred to as a tenant of the provider entity. Users associated with the subscriber entity access the cloud resources over a network, which may include the public Internet. In contrast to an on-prem implementation, a subscriber entity does not have physical control of the computing devices that are in the cloud, and has digital access to resources provided by the computing devices only to the extent that such access is enabled by the provider entity.

In some implementations, the computing environment 1200 can include on-prem and cloud-based computing resources, or only cloud-based resources. For example, an entity may have on-prem computing devices and a private cloud. In this example, the entity operates the data intake and query system 1210 and can choose to execute the data intake and query system 1210 on an on-prem computing device or in the cloud. In another example, a provider entity operates the data intake and query system 1210 in a public cloud and provides the functionality of the data intake and query system 1210 as a service, for example under a Software-as-a-Service (SaaS) model, to entities that pay for the user of the service on a subscription basis. In this example, the provider entity can provision a separate tenant (or possibly multiple tenants) in the public cloud network for each subscriber entity, where each tenant executes a separate and distinct instance of the data intake and query system 1210. In some implementations, the entity providing the data intake and query system 1210 is itself subscribing to the cloud services of a cloud service provider. As an example, a first entity provides computing resources under a public cloud service model, a second entity subscribes to the cloud services of the first provider entity and uses the cloud computing resources to operate the data intake and query system 1210, and a third entity can subscribe to the services of the second provider entity in order to use the functionality of the data intake and query system 1210. In this example, the data sources are associated with the third entity, users accessing the data intake and query system 1210 are associated with the third entity, and the analytics and insights provided by the data intake and query system 1210 are for purposes of the third entity's operations.

Figure 13:
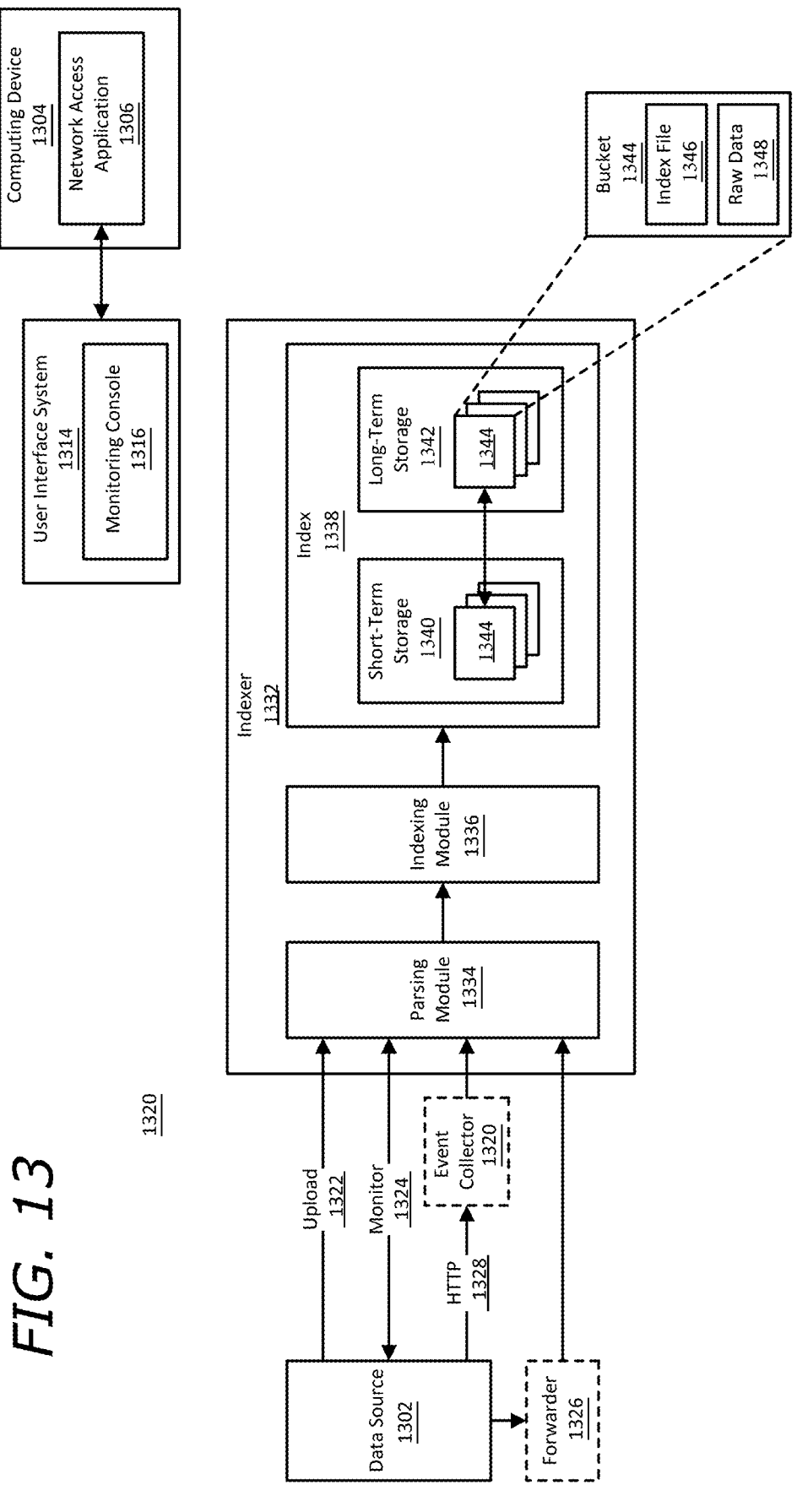
FIG. 13 is a block diagram illustrating in greater detail an example of an indexing system of a data intake and query system, such as the data intake and query system of FIG. 12 according to an implementation of the disclosure.

FIG. 13 is a block diagram illustrating in greater detail an example of an indexing system 1320 of a data intake and query system, such as the data intake and query system 1210 of FIG. 12. The indexing system 1320 of FIG. 13 uses various methods to obtain machine data from a data source 1302 and stores the data in an index 1338 of an indexer 1332. As discussed previously, a data source is a hardware, software, physical, and/or virtual component of a computing device that produces machine data in an automated fashion and/or as a result of user interaction. Examples of data sources include files and directories; network event logs; operating system logs, operational data, and performance monitoring data; metrics; first-in, first-out queues; scripted inputs; and modular inputs, among others. The indexing system 1320 enables the data intake and query system to obtain the machine data produced by the data source 1302 and to store the data for searching and retrieval.

Users can administer the operations of the indexing system 1320 using a computing device 1304 that can access the indexing system 1320 through a user interface system 1314 of the data intake and query system. For example, the computing device 1304 can be executing a network access application 1306, such as a web browser or a terminal, through which a user can access a monitoring console 1316 provided by the user interface system 1314. The monitoring console 1316 can enable operations such as: identifying the data source 1302 for data ingestion; configuring the indexer 1332 to index the data from the data source 1332; configuring a data ingestion method; configuring, deploying, and managing clusters of indexers; and viewing the topology and performance of a deployment of the data intake and query system, among other operations. The operations performed by the indexing system 1320 may be referred to as "index time" operations, which are distinct from "search time" operations that are discussed further below.

The indexer 1332, which may be referred to herein as a data indexing component, coordinates and performs most of the index time operations. The indexer 1332 can be implemented using program code that can be executed on a computing device. The program code for the indexer 1332 can be stored on a non-transitory computer-readable medium (e.g. a magnetic, optical, or solid state storage disk, a flash memory, or another type of non-transitory storage media), and from this medium can be loaded or copied to the memory of the computing device. One or more hardware processors of the computing device can read the program code from the memory and execute the program code in order to implement the operations of the indexer 1332. In some implementations, the indexer 1332 executes on the computing device 1304 through which a user can access the indexing system 1320. In some implementations, the indexer 1332 executes on a different computing device than the illustrated computing device 1304.

The indexer 1332 may be executing on the computing device that also provides the data source 1302 or may be executing on a different computing device. In implementations wherein the indexer 1332 is on the same computing device as the data source 1302, the data produced by the data source 1302 may be referred to as "local data." In other implementations the data source 1302 is a component of a first computing device and the indexer 1332 executes on a second computing device that is different from the first computing device. In these implementations, the data produced by the data source 1302 may be referred to as "remote data." In some implementations, the first computing device is "on-prem" and in some implementations the first computing device is "in the cloud." In some implementations, the indexer 1332 executes on a computing device in the cloud and the operations of the indexer 1332 are provided as a service to entities that subscribe to the services provided by the data intake and query system.

For a given data produced by the data source 1302, the indexing system 1320 can be configured to use one of several methods to ingest the data into the indexer 1332. These methods include upload 1322, monitor 1324, using a forwarder 1326, or using HyperText Transfer Protocol (HTTP 1328) and an event collector 1330. These and other methods for data ingestion may be referred to as "getting data in" (GDI) methods.

Using the upload 1322 method, a user can specify a file for uploading into the indexer 1332. For example, the monitoring console 1316 can include commands or an interface through which the user can specify where the file is located (e.g., on which computing device and/or in which directory of a file system) and the name of the file. The file may be located at the data source 1302 or maybe on the computing device where the indexer 1332 is executing. Once uploading is initiated, the indexer 1332 processes the file, as discussed further below. Uploading is a manual process and occurs when instigated by a user. For automated data ingestion, the other ingestion methods are used.

The monitor 1324 method enables the indexing system 1302 to monitor the data source 1302 and continuously or periodically obtain data produced by the data source 1302 for ingestion by the indexer 1332. For example, using the monitoring console 1316, a user can specify a file or directory for monitoring. In this example, the indexing system 1302 can execute a monitoring process that detects whenever the file or directory is modified and causes the file or directory contents to be sent to the indexer 1332. As another example, a user can specify a network port for monitoring. In this example, a monitoring process can capture data received at or transmitting from the network port and cause the data to be sent to the indexer 1332. In various examples, monitoring can also be configured for data sources such as operating system event logs, performance data generated by an operating system, operating system registries, operating system directory services, and other data sources.

Monitoring is available when the data source 1302 is local to the indexer 1332 (e.g., the data source 1302 is on the computing device where the indexer 1332 is executing). Other data ingestion methods, including forwarding and the event collector 1330, can be used for either local or remote data sources.

A forwarder 1326, which may be referred to herein as a data forwarding component, is a software process that sends data from the data source 1302 to the indexer 1332. The forwarder 1326 can be implemented using program code that can be executed on the computer device that provides the data source 1302. A user launches the program code for the forwarder 1326 on the computing device that provides the data source 1302. The user can further configure the forwarder 1326, for example to specify a receiver for the data being forwarded (e.g., one or more indexers, another forwarder, and/or another recipient system), to enable or disable data forwarding, and to specify a file, directory, network events, operating system data, or other data to forward, among other operations.

The forwarder 1326 can provide various capabilities. For example, the forwarder 1326 can send the data unprocessed or can perform minimal processing on the data before sending the data to the indexer 1332. Minimal processing can include, for example, adding metadata tags to the data to identify a source, source type, and/or host, among other information, dividing the data into blocks, and/or applying a timestamp to the data. In some implementations, the forwarder 1326 can break the data into individual events (event generation is discussed further below) and send the events to a receiver. Other operations that the forwarder 1326 may be configured to perform include buffering data, compressing data, and using secure protocols for sending the data, for example.

Forwarders can be configured in various topologies. For example, multiple forwarders can send data to the same indexer. As another example, a forwarder can be configured to filter and/or route events to specific receivers (e.g., different indexers), and/or discard events. As another example, a forwarder can be configured to send data to another forwarder, or to a receiver that is not an indexer or a forwarder (such as, for example, a log aggregator).

The event collector 1330 provides an alternate method for obtaining data from the data source 1302. The event collector 1330 enables data and application events to be sent to the indexer 1332 using HTTP 1328. The event collector 1330 can be implemented using program code that can be executing on a computing device. The program code may be a component of the data intake and query system or can be a standalone component that can be executed independently of the data intake and query system and operates in cooperation with the data intake and query system.

To use the event collector 1330, a user can, for example using the monitoring console 1316 or a similar interface provided by the user interface system 1314, enable the event collector 1330 and configure an authentication token. In this context, an authentication token is a piece of digital data generated by a computing device, such as a server, that contains information to identify a particular entity, such as a user or a computing device, to the server. The token will contain identification information for the entity (e.g., an alphanumeric string that is unique to each token) and a code that authenticates the entity with the server. The token can be used, for example, by the data source 1302 as an alternative method to using a username and password for authentication.

To send data to the event collector 1330, the data source 1302 is supplied with a token and can then send HTTP 1328 requests to the event collector 1330. To send HTTP 1328 requests, the data source 1302 can be configured to use an HTTP client and/or to use logging libraries such as those supplied by Java, JavaScript, and .NET libraries. An HTTP client enables the data source 1302 to send data to the event collector 1330 by supplying the data, and a Uniform Resource Identifier (URI) for the event collector 1330 to the HTTP client. The HTTP client then handles establishing a connection with the event collector 1330, transmitting a request containing the data, closing the connection, and receiving an acknowledgment if the event collector 1330 sends one. Logging libraries enable HTTP 1328 requests to the event collector 1330 to be generated directly by the data source. For example, an application can include or link a logging library, and through functionality provided by the logging library manage establishing a connection with the event collector 1330, transmitting a request, and receiving an acknowledgement.

An HTTP 1328 request to the event collector 1330 can contain a token, a channel identifier, event metadata, and/or event data. The token authenticates the request with the event collector 1330. The channel identifier, if available in the indexing system 1320, enables the event collector 1330 to segregate and keep separate data from different data sources. The event metadata can include one or more key-value pairs that describe the data source 1302 or the event data included in the request. For example, the event metadata can include key-value pairs specifying a timestamp, a hostname, a source, a source type, or an index where the event data should be indexed. The event data can be a structured data object, such as a JavaScript Object Notation (JSON) object, or raw text. The structured data object can include both event data and event metadata. Additionally, one request can include event data for one or more events.

In some implementations, the event collector 1330 extracts events from HTTP 1328 requests and sends the events to the indexer 1332. The event collector 1330 can further be configured to send events to one or more indexers. Extracting the events can include associating any metadata in a request with the event or events included in the request. In these implementations, event generation by the indexer 1332 (discussed further below) is bypassed, and the indexer 1332 moves the events directly to indexing. In some implementations, the event collector 1330 extracts event data from a request and outputs the event data to the indexer 1332, and the indexer generates events from the event data. In some implementations, the event collector 1330 sends an acknowledgement message to the data source 1302 to indicate that the event collector 1330 has received a particular request form the data source 1302, and/or to indicate to the data source 1302 that events in the request have been added to an index.

The indexer 1332 ingests incoming data and transforms the data into searchable knowledge in the form of events. In the data intake and query system, an event is a single piece of data that represents activity of the component represented in FIG. 13 by the data source 1302. An event can be, for example, a single record in a log file that records a single action performed by the component (e.g., a user login, a disk read, transmission of a network packet, etc.). An event includes one or more fields that together describe the action captured by the event, where a field is a key-value pair (also referred to as a name-value pair). In some cases, an event includes both the key and the value, and in some cases the event includes only the value and the key can be inferred or assumed.

Transformation of data into events can include event generation and event indexing. Event generation includes identifying each discrete piece of data that represents one event and associating each event with a timestamp and possibly other information (which may be referred to herein as metadata). Event indexing includes storing of each event in the data structure of an index. As an example, the indexer 1332 can include a parsing module 1334 and an indexing module 1336 for generating and storing the events. The parsing module 1334 and indexing module 1336 can be modular and pipelined, such that one component can be operating on a first set of data while the second component is simultaneously operating on a second sent of data. Additionally, the indexer 1332 may at any time have multiple instances of the parsing module 1334 and indexing module 1336, with each set of instances configured to simultaneously operate on data from the same data source or from different data sources. The parsing module 1334 and indexing module 1336 are illustrated in FIG. 13 to facilitate discussion, with the understanding that implementations with other components are possible to achieve the same functionality.

The parsing module 1334 determines information about incoming event data, where the information can be used to identify events within the event data. For example, the parsing module 1334 can associate a source type with the event data. A source type identifies the data source 1302 and describes a possible data structure of event data produced by the data source 1302. For example, the source type can indicate which fields to expect in events generated at the data source 1302 and the keys for the values in the fields, and possibly other information such as sizes of fields, an order of the fields, a field separator, and so on. The source type of the data source 1302 can be specified when the data source 1302 is configured as a source of event data. Alternatively, the parsing module 1334 can determine the source type from the event data, for example from an event field in the event data or using machine learning techniques applied to the event data.

Other information that the parsing module 1334 can determine includes timestamps. In some cases, an event includes a timestamp as a field, and the timestamp indicates a point in time when the action represented by the event occurred or was recorded by the data source 1302 as event data. In these cases, the parsing module 1334 may be able to determine from the source type associated with the event data that the timestamps can be extracted from the events themselves. In some cases, an event does not include a timestamp and the parsing module 1334 determines a timestamp for the event, for example from a name associated with the event data from the data source 1302 (e.g., a file name when the event data is in the form of a file) or a time associated with the event data (e.g., a file modification time). As another example, when the parsing module 1334 is not able to determine a timestamp from the event data, the parsing module 1334 may use the time at which it is indexing the event data. As another example, the parsing module 1334 can use a user-configured rule to determine the timestamps to associate with events.

The parsing module 1334 can further determine event boundaries. In some cases, a single line (e.g., a sequence of characters ending with a line termination) in event data represents one event while in other cases, a single line represents multiple events. In yet other cases, one event may span multiple lines within the event data. The parsing module 1334 may be able to determine event boundaries from the source type associated with the event data, for example from a data structure indicated by the source type. In some implementations, a user can configure rules the parsing module 1334 can use to identify event boundaries.

The parsing module 1334 can further extract data from events and possibly also perform transformations on the events. For example, the parsing module 1334 can extract a set of fields (key-value pairs) for each event, such as a host or hostname, source or source name, and/or source type. The parsing module 1334 may extract certain fields by default or based on a user configuration. Alternatively or additionally, the parsing module 1334 may add fields to events, such as a source type or a user-configured field. As another example of a transformation, the parsing module 1334 can anonymize fields in events to mask sensitive information, such as social security numbers or account numbers. Anonymizing fields can include changing or replacing values of specific fields. The parsing component 1334 can further perform user-configured transformations.

The parsing module 1334 outputs the results of processing incoming event data to the indexing module 1336, which performs event segmentation and builds index data structures.

Event segmentation identifies searchable segments, which may alternatively be referred to as searchable terms or keywords, which can be used by the search system of the data intake and query system to search the event data. A searchable segment may be a part of a field in an event or an entire field. The indexer 1332 can be configured to identify searchable segments that are parts of fields, searchable segments that are entire fields, or both. The parsing module 1334 organizes the searchable segments into a lexicon or dictionary for the event data, with the lexicon including each searchable segment (e.g., the field "src=10.10.1.1") and a reference to the location of each occurrence of the searchable segment within the event data (e.g., the location within the event data of each occurrence of "src=10.10.1.1"). As discussed further below, the search system can use the lexicon, which is stored in an index file 1346, to find event data that matches a search query. In some implementations, segmentation can alternatively be performed by the forwarder 1326. Segmentation can also be disabled, in which case the indexer 1332 will not build a lexicon for the event data. When segmentation is disabled, the search system searches the event data directly.

Building index data structures generates the index 1338. The index 1338 is a storage data structure on a storage device (e.g., a disk drive or other physical device for storing digital data). The storage device may be a component of the computing device on which the indexer 1332 is operating (referred to herein as local storage) or may be a component of a different computing device (referred to herein as remote storage) that the indexer 1338 has access to over a network. The indexer 1332 can manage more than one index and can manage indexes of different types. For example, the indexer 1332 can manage event indexes, which impose minimal structure on stored data and can accommodate any type of data. As another example, the indexer 1332 can manage metrics indexes, which use a highly structured format to handle the higher volume and lower latency demands associated with metrics data.

The indexing module 1336 organizes files in the index 1338 in directories referred to as buckets. The files in a bucket 1344 can include raw data files, index files, and possibly also other metadata files. As used herein, "raw data" means data as when the data was produced by the data source 1302, without alteration to the format or content. As noted previously, the parsing component 1334 may add fields to event data and/or perform transformations on fields in the event data. Event data that has been altered in this way is referred to herein as enriched data. A raw data file 1348 can include enriched data, in addition to or instead of raw data. The raw data file 1348 may be compressed to reduce disk usage. An index file 1346, which may also be referred to herein as a "time-series index" or tsidx file, contains metadata that the indexer 1332 can use to search a corresponding raw data file 1348. As noted above, the metadata in the index file 1346 includes a lexicon of the event data, which associates each unique keyword in the event data with a reference to the location of event data within the raw data file 1348. The keyword data in the index file 1346 may also be referred to as an inverted index. In various implementations, the data intake and query system can use index files for other purposes, such as to store data summarizations that can be used to accelerate searches.

A bucket 1344 includes event data for a particular range of time. The indexing module 1336 arranges buckets in the index 1338 according to the age of the buckets, such that buckets for more recent ranges of time are stored in short-term storage 1340 and buckets for less recent ranges of time are stored in long-term storage 1342. Short-term storage 1340 may be faster to access while long-term storage 1342 may be slower to access. Buckets may be moves from short-term storage 1340 to long-term storage 1342 according to a configurable data retention policy, which can indicate at what point in time a bucket is old enough to be moved.

A bucket's location in short-term storage 1340 or long-term storage 1342 can also be indicated by the bucket's status. As an example, a bucket's status can be "hot," "warm," "cold," "frozen," or "thawed." In this example, hot bucket is one to which the indexer 1332 is writing data and the bucket becomes a warm bucket when the index 1332 stops writing data to it. In this example, both hot and warm buckets reside in short-term storage 1340. Continuing this example, when a warm bucket is moved to long-term storage 1342, the bucket becomes a cold bucket. A cold bucket can become a frozen bucket after a period of time, at which point the bucket may be deleted or archived. An archived bucket cannot be searched. When an archived bucket is retrieved for searching, the bucket becomes thawed and can then be searched.

The indexing system 1320 can include more than one indexer, where a group of indexers is referred to as an index cluster. The indexers in an index cluster may also be referred to as peer nodes. In an index cluster, the indexers are configured to replicate each other's data by copying buckets from one indexer to another. The number of copies of a bucket can be configured (e.g., three copies of each buckets must exist within the cluster), and indexers to which buckets are copied may be selected to optimize distribution of data across the cluster.

A user can view the performance of the indexing system 1320 through the monitoring console 1316 provided by the user interface system 1314. Using the monitoring console 1316, the user can configure and monitor an index cluster, and see information such as disk usage by an index, volume usage by an indexer, index and volume size over time, data age, statistics for bucket types, and bucket settings, among other information.

Figure 14:
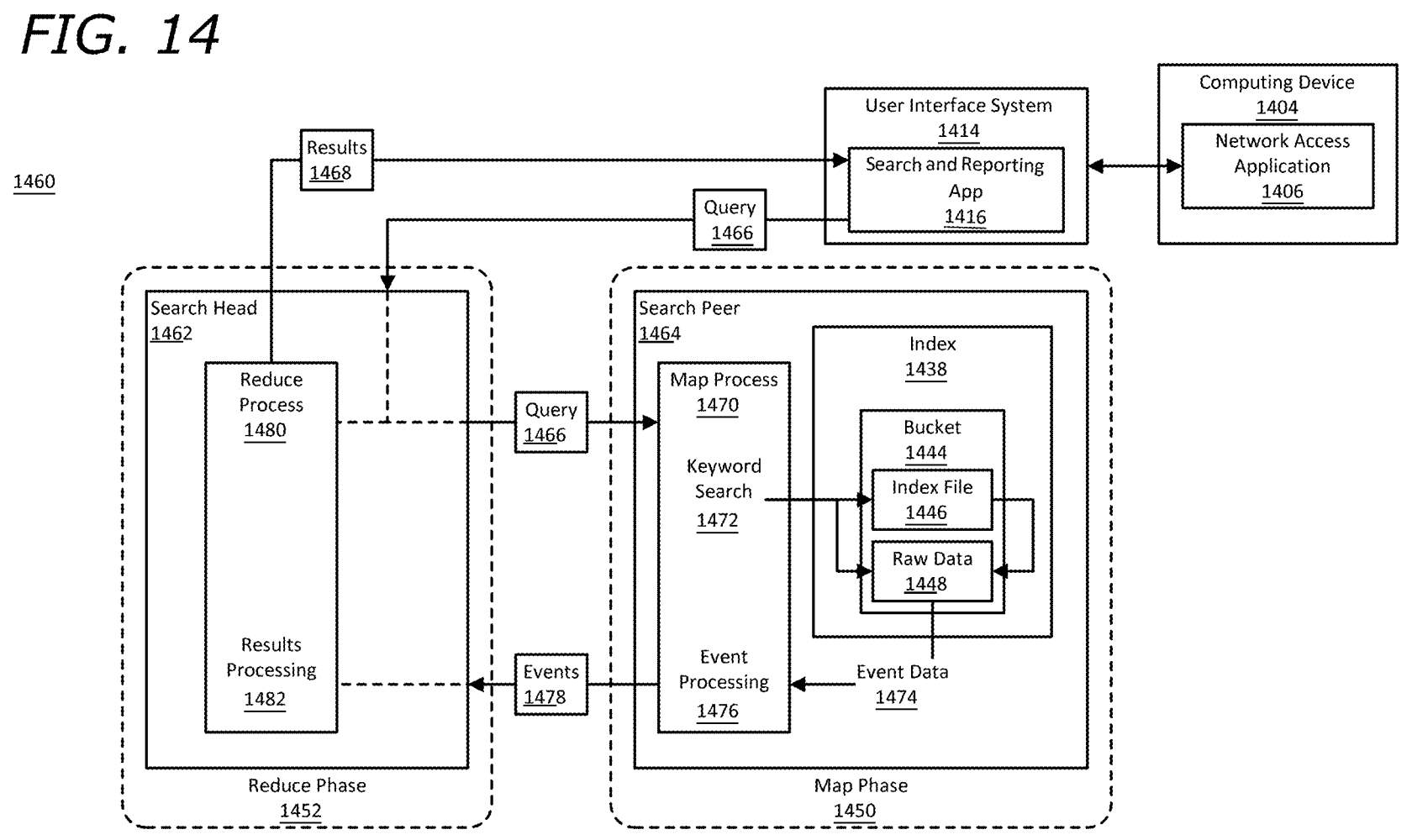

FIG. 14 is a block diagram illustrating in greater detail an example of the search system 1460 of a data intake and query system, such as the data intake and query system 1210 of FIG. 12. The search system 1460 of FIG. 14 issues a query 1466 to a search head 1462, which sends the query 1466 to a search peer 1464. Using a map process 1470, the search peer 1464 searches the appropriate index 1438 for events identified by the query 1466 and sends events 1478 so identified back to the search head 1462. Using a reduce process 1482, the search head 1462 processes the events 1478 and produces results 1468 to respond to the query 1466. The results 1468 can provide useful insights about the data stored in the index 1438. These insights can aid in the administration of information technology systems, in security analysis of information technology systems, and/or in analysis of the development environment provided by information technology systems.

The query 1466 that initiates a search is produced by a search and reporting app 1416 that is available through the user interface system 1414 of the data intake and query system. Using a network access application 1406 executing on a computing device 1404, a user can input the query 1466 into a search field provided by the search and reporting app 1416. Alternatively or additionally, the search and reporting app 1416 can include pre-configured queries or stored queries that can be activated by the user. In some cases, the search and reporting app 1416 initiates the query 1466 when the user enters the query 1466. In these cases, the query 1466 maybe referred to as an "ad-hoc" query. In some cases, the search and reporting app 1416 initiates the query 1466 based on a schedule. For example, the search and reporting app 1416 can be configured to execute the query 1466 once per hour, once per day, at a specific time, on a specific date, or at some other time that can be specified by a date, time, and/or frequency. These types of queries maybe referred to as scheduled queries.

The query 1466 is specified using a search processing language. The search processing language includes commands or search terms that the search peer 1464 will use to identify events to return in the search results 1468. The search processing language can further include commands for filtering events, extracting more information from events, evaluating fields in events, aggregating events, calculating statistics over events, organizing the results, and/or generating charts, graphs, or other visualizations, among other examples. Some search commands may have functions and arguments associated with them, which can, for example, specify how the commands operate on results and which fields to act upon. The search processing language may further include constructs that enable the query 1466 to include sequential commands, where a subsequent command may operate on the results of a prior command. As an example, sequential commands may be separated in the query 1466 by a vertical line ("|" or "pipe") symbol.

In addition to one or more search commands, the query 1466 includes a time indicator. The time indicator limits searching to events that have timestamps described by the indicator. For example, the time indicator can indicate a specific point in time (e.g., 10:00:00 am today), in which case only events that have the point in time for their timestamp will be searched. As another example, the time indicator can indicate a range of time (e.g., the last 24 hours), in which case only events whose timestamps fall within the range of time will be searched. The time indicator can alternatively indicate all of time, in which case all events will be searched.

Processing of the search query 1466 occurs in two broad phases: a map phase 1450 and a reduce phase 1452. The map phase 1450 takes place across one or more search peers. In the map phase 1450, the search peers locate event data that matches the search terms in the search query 1466 and sorts the event data into field-value pairs. When the map phase 1450 is complete, the search peers send events that they have found to one or more search heads for the reduce phase 1452. During the reduce phase 1452, the search heads process the events through commands in the search query 1466 and aggregate the events to produce the final search results 1468.

A search head, such as the search head 1462 illustrated in FIG. 14, is a component of the search system 1460 that manages searches. The search head 1462, which may also be referred to herein as a search management component, can be implemented using program code that can be executed on a computing device. The program code for the search head 1462 can be stored on a non-transitory computer-readable medium and from this medium can be loaded or copied to the memory of a computing device. One or more hardware processors of the computing device can read the program code from the memory and execute the program code in order to implement the operations of the search head 1462.

Upon receiving the search query 1466, the search head 1462 directs the query 1466 to one or more search peers, such as the search peer 1464 illustrated in FIG. 14. "Search peer" is an alternate name for "indexer" and a search peer may be largely similar to the indexer described previously. The search peer 1464 may be referred to as a "peer node" when the search peer 1464 is part of an indexer cluster. The search peer 1464, which may also be referred to as a search execution component, can be implemented using program code that can be executed on a computing device. In some implementations, one set of program code implements both the search head 1462 and the search peer 1464 such that the search head 1462 and the search peer 1464 form one component. In some implementations, the search head 1462 is an independent piece of code that performs searching and no indexing functionality. In these implementations, the search head 1462 may be referred to as a dedicated search head.

The search head 1462 may consider multiple criteria when determining whether to send the query 1466 to the particular search peer 1464. For example, the search system 1460 may be configured to include multiple search peers that each have duplicative copies of at least some of the event data and are implanted using different hardware resources q. In this example, the sending the search query 1466 to more than one search peer allows the search system 1460 to distribute the search workload across different hardware resources. As another example, search system 1460 may include different search peers for different purposes (e.g., one has an index storing a first type of data or from a first data source while a second has an index storing a second type of data or from a second data source). In this example, the search query 1466 may specify which indexes to search, and the search head 1462 will send the query 1466 to the search peers that have those indexes.

To identify events 1478 to send back to the search head 1462, the search peer 1464 performs a map process 1470 to obtain event data 1474 from the index 1438 that is maintained by the search peer 1464. During a first phase of the map process 1470, the search peer 1464 identifies buckets that have events that are described by the time indicator in the search query 1466. As noted above, a bucket contains events whose timestamps fall within a particular range of time. For each bucket 1444 whose events can be described by the time indicator, during a second phase of the map process 1470, the search peer 1464 performs a keyword search 1474 using search terms specified in the search query 1466. The search terms can be one or more of keywords, phrases, fields, Boolean expressions, and/or comparison expressions that in combination describe events being searched for. When segmentation is enabled at index time, the search peer 1464 performs the keyword search 1472 on the bucket's index file 1446. As noted previously, the index file 1446 includes a lexicon of the searchable terms in the events stored in the bucket's raw data 1448 file. The keyword search 1472 searches the lexicon for searchable terms that correspond to one or more of the search terms in the query 1466. As also noted above, the lexicon incudes, for each searchable term, a reference to each location in the raw data 1448 file where the searchable term can be found. Thus, when the keyword search identifies a searchable term in the index file 1446 that matches a search term in the query 1466, the search peer 1464 can use the location references to extract from the raw data 1448 file the event data 1474 for each event that include the searchable term.

In cases where segmentation was disabled at index time, the search peer 1464 performs the keyword search 1472 directly on the raw data 1448 file. To search the raw data 1448, the search peer 1464 may identify searchable segments in events in a similar manner as when the data was indexed. Thus, depending on how the search peer 1464 is configured, the search peer 1464 may look at event fields and/or parts of event fields to determine whether an event matches the query 1466. Any matching events can be added to the event data 1474 read from the raw data 1448 file. The search peer 1464 can further be configured to enable segmentation at search time, so that searching of the index 1438 causes the search peer 1464 to build a lexicon in the index file 1446.

The event data 1474 obtained from the raw data 1448 file includes the full text of each event found by the keyword search 1472. During a third phase of the map process 1470, the search peer 1464 performs event processing 1476 on the event data 1474, with the steps performed being determined by the configuration of the search peer 1464 and/or commands in the search query 1466. For example, the search peer 1464 can be configured to perform field discovery and field extraction. Field discovery is a process by which the search peer 1464 identifies and extracts key-value pairs from the events in the event data 1474. The search peer 1464 can, for example, be configured to automatically extract the first 100 fields (or another number of fields) in the event data 1474 that can be identified as key-value pairs. As another example, the search peer 1464 can extract any fields explicitly mentioned in the search query 1466. The search peer 1464 can, alternatively or additionally, be configured with particular field extractions to perform.

Other examples of steps that can be performed during event processing 1476 include: field aliasing (assigning an alternate name to a field); addition of fields from lookups (adding fields from an external source to events based on existing field values in the events); associating event types with events; source type renaming (changing the name of the source type associated with particular events); and tagging (adding one or more strings of text, or a "tags" to particular events), among other examples.

The search peer 1464 sends processed events 1478 to the search head 1462, which performs a reduce process 1480. The reduce process 1480 potentially receives events from multiple search peers and performs various results processing 1482 steps on the received events. The results processing 1482 steps can include, for example, aggregating the events received from different search peers into a single set of events, deduplicating and aggregating fields discovered by different search peers, counting the number of events found, and sorting the events by timestamp (e.g., newest first or oldest first), among other examples. Results processing 1482 can further include applying commands from the search query 1466 to the events. The query 1466 can include, for example, commands for evaluating and/or manipulating fields (e.g., to generate new fields from existing fields or parse fields that have more than one value). As another example, the query 1466 can include commands for calculating statistics over the events, such as counts of the occurrences of fields, or sums, averages, ranges, and so on, of field values. As another example, the query 1466 can include commands for generating statistical values for purposes of generating charts of graphs of the events.

The reduce process 1480 outputs the events found by the search query 1466, as well as information about the events. The search head 1462 transmits the events and the information about the events as search results 1468, which are received by the search and reporting app 1416. The search and reporting app 1416 can generate visual interfaces for viewing the search results 1468. The search and reporting app 1416 can, for example, output visual interfaces for the network access application 1406 running on a computing device 1404 to generate.

The visual interfaces can include various visualizations of the search results 1468, such as tables, line or area charts, Chloropleth maps, or single values. The search and reporting app 1416 can organize the visualizations into a dashboard, where the dashboard includes a panel for each visualization. A dashboard can thus include, for example, a panel listing the raw event data for the events in the search results 1468, a panel listing fields extracted at index time and/or found through field discovery along with statistics for those fields, and/or a timeline chart indicating how many events occurred at specific points in time (as indicated by the timestamps associated with each event). In various implementations, the search and reporting app 1416 can provide one or more default dashboards. Alternatively or additionally, the search and reporting app 1416 can include functionality that enables a user to configure custom dashboards.

The search and reporting app 1416 can also enable further investigation into the events in the search results 1416. The process of further investigation may be referred to as drill-down. For example, a visualization in a dashboard can include interactive elements, which, when selected, provide options for finding out more about the data being displayed by the interactive elements. To find out more, an interactive element can, for example, generate a new search that includes some of the data being displayed by the interactive element, and thus may be more focused than the initial search query 1466. As another example, an interactive element can launch a different dashboard whose panels include more detailed information about the data that is displayed by the interactive element. Other examples of actions that can be performed by interactive elements in a dashboard include opening a link, playing an audio or video file, or launching another application, among other examples.

Figure 15:
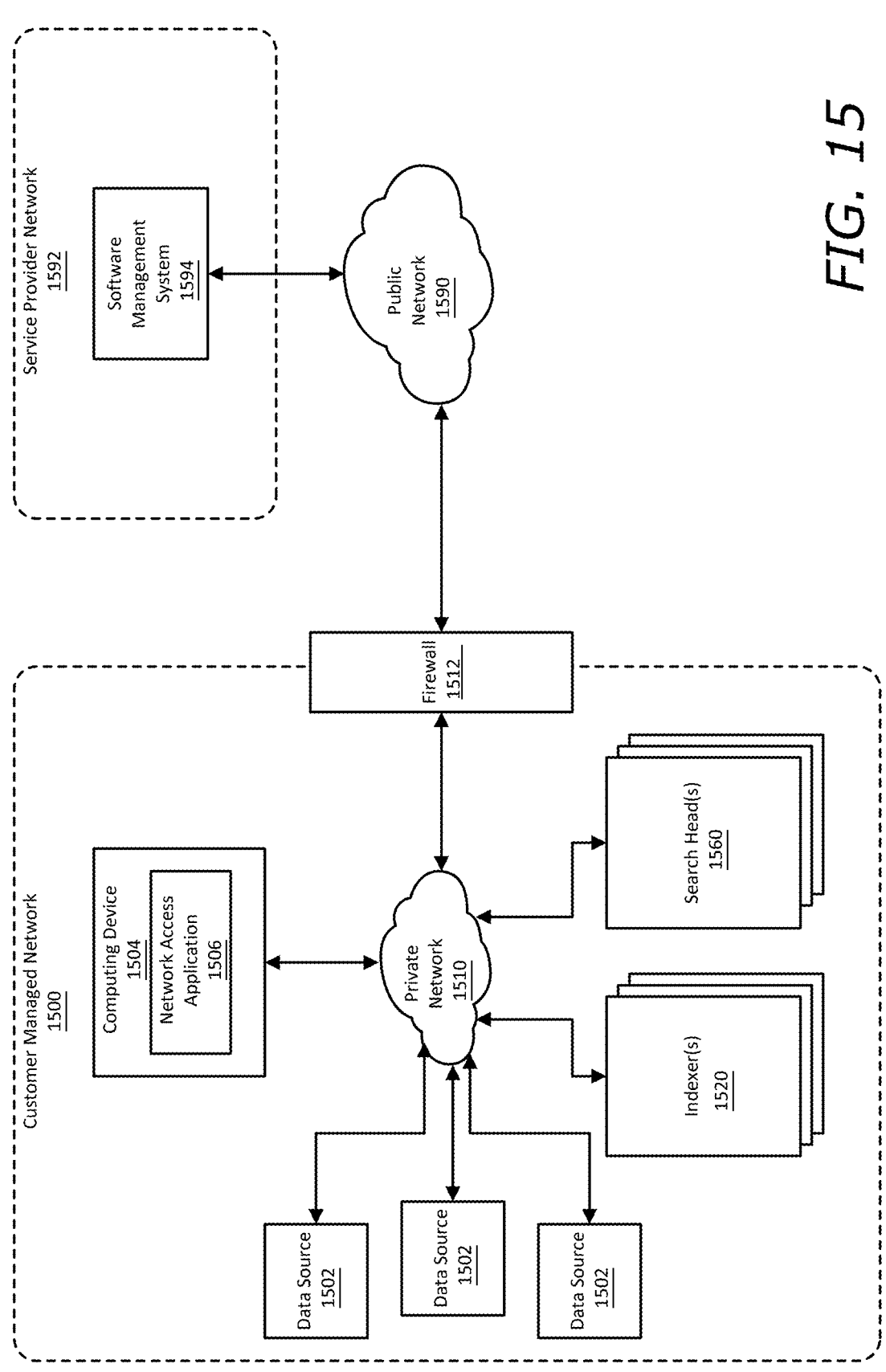
FIG. 15 illustrates an example of a self-managed network 1500 that includes a data intake and query system according to an implementation of the disclosure.

FIG. 15 illustrates an example of a self-managed network 1500 that includes a data intake and query system. "Self-managed" in this instance means that the entity that is operating the self-managed network 1500 configures, administers, maintains, and/or operates the data intake and query system using its own compute resources and people. Further, the self-managed network 1500 of this example is part of the entity's on-premise network and comprises a set of compute, memory, and networking resources that are located, for example, within the confines of a entity's data center. These resources can include software and hardware resources. The entity can, for example, be a company or enterprise, a school, government entity, or other entity. Since the self-managed network 1500 is located within the customer's on-prem environment, such as in the entity's data center, the operation and management of the self-managed network 1500, including of the resources in the self-managed network 1500, is under the control of the entity. For example, administrative personnel of the entity have complete access to and control over the configuration, management, and security of the self-managed network 1500 and its resources.

The self-managed network 1500 can execute one or more instances of the data intake and query system. An instance of the data intake and query system may be executed by one or more computing devices that are part of the self-managed network 1500. A data intake and query system instance can comprise an indexing system and a search system, where the indexing system includes one or more indexers 1520 and the search system includes one or more search heads 1560.

As depicted in FIG. 15, the self-managed network 1500 can include one or more data sources 1502. Data received from these data sources may be processed by an instance of the data intake and query system within self-managed network 1500. The data sources 1502 and the data intake and query system instance can be communicatively coupled to each other via a private network 1510.

Users associated with the entity can interact with and avail themselves of the functions performed by a data intake and query system instance using computing devices. As depicted in FIG. 15, a computing device 1504 can execute a network access application 1506 (e.g., a web browser), that can communicate with the data intake and query system instance and with data sources 1502 via the private network 1510. Using the computing device 1504, a user can perform various operations with respect to the data intake and query system, such as management and administration of the data intake and query system, generation of knowledge objects, and other functions. Results generated from processing performed by the data intake and query system instance may be communicated to the computing device 1504 and output to the user via an output system (e.g., a screen) of the computing device 1504.

The self-managed network 1500 can also be connected to other networks that are outside the entity's on-premise environment/network, such as networks outside the entity's data center. Connectivity to these other external networks is controlled and regulated through one or more layers of security provided by the self-managed network 1500. One or more of these security layers can be implemented using firewalls 1512. The firewalls 1512 form a layer of security around the self-managed network 1500 and regulate the transmission of traffic from the self-managed network 1500 to the other networks and from these other networks to the self-managed network 1500.

Networks external to the self-managed network can include various types of networks including public networks 1590, other private networks, and/or cloud networks provided by one or more cloud service providers. An example of a public network 1590 is the Internet. In the example depicted in FIG. 15, the self-managed network 1500 is connected to a service provider network 1592 provided by a cloud service provider via the public network 1590.

In some implementations, resources provided by a cloud service provider may be used to facilitate the configuration and management of resources within the self-managed network 1500. For example, configuration and management of a data intake and query system instance in the self-managed network 1500 may be facilitated by a software management system 1594 operating in the service provider network 1592. There are various ways in which the software management system 1594 can facilitate the configuration and management of a data intake and query system instance within the self-managed network 1500. As one example, the software management system 1594 may facilitate the download of software including software updates for the data intake and query system. In this example, the software management system 1594 may store information indicative of the versions of the various data intake and query system instances present in the self-managed network 1500. When a software patch or upgrade is available for an instance, the software management system 1594 may inform the self-managed network 1500 of the patch or upgrade. This can be done via messages communicated from the software management system 1594 to the self-managed network 1500.

The software management system 1594 may also provide simplified ways for the patches and/or upgrades to be downloaded and applied to the self-managed network 1500. For example, a message communicated from the software management system 1594 to the self-managed network 1500 regarding a software upgrade may include a Uniform Resource Identifier (URI) that can be used by a system administrator of the self-managed network 1500 to download the upgrade to the self-managed network 1500. In this manner, management resources provided by a cloud service provider using the service provider network 1592 and which are located outside the self-managed network 1500 can be used to facilitate the configuration and management of one or more resources within the entity's on-prem environment. In some implementations, the download of the upgrades and patches may be automated, whereby the software management system 1594 is authorized to, upon determining that a patch is applicable to a data intake and query system instance inside the self-managed network 1500, automatically communicate the upgrade or patch to self-managed network 1500 and cause it to be installed within self-managed network 1500.

Various examples and possible implementations have been described above, which recite certain features and/or functions. Although these examples and implementations have been described in language specific to structural features and/or functions, it is understood that the subject matter defined in the appended claims is not necessarily limited to the specific features or functions described above. Rather, the specific features and functions described above are disclosed as examples of implementing the claims, and other equivalent features and acts are intended to be within the scope of the claims. Further, any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Processing of the various components of systems illustrated herein can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Examples have been described with reference to flow chart illustrations and/or block diagrams of methods, apparatus (systems), and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently. e.g., through multi-threaded processing, interrupt processing, or multiple processors or processor cores or on other parallel architectures, rather than sequentially.

What is claimed is:

1. A computer-implemented method, comprising:
obtaining historical log data including a plurality of logs being recordings of activities or occurrences during operation of a network device, wherein each recording includes or involves a script or an executable file;
obtaining synthetic log data including a plurality of synthetic logs being synthetic data representative of activities or occurrences during operation of the network device, wherein the synthetic data include or involve synthetic scripts or synthetic executable files that include a label indicating whether each synthetic script or synthetic executable file is suspicious or benign;
deploying a first generative machine learning model by providing the historical log data and the synthetic log data as input, wherein the first generative machine learning model is trained and configured to generate training probabilistic labels indicating a first level of suspiciousness for each script or executable file of the historical log data;
performing a re-training process or a fine-tuning process on a large language model (LLM) including:
processing a batch of the plurality of logs of the historical log data to generate second probabilistic labels indicating a second level of suspiciousness for each script or executable file of the batch of the plurality of logs,
determining a loss between the second probabilistic labels and corresponding labels of the training probabilistic labels, and
adjusting weights or parameters of the LLM according to the loss; and
storing the LLM following implementation of the re-training or the fine-tuning process.

2. The computer-implemented method of claim 1, wherein the script or the executable of each recording of the historical log data is a PowerShell script.

3. The computer-implemented method of claim 1, wherein the recordings of the historical log data are Windows Events.

4. The computer-implemented method of claim 1, further comprising:
deploying the LLM by providing additional log data including a second plurality of logs being additional recordings of activities or occurrences during subsequent operation of the network device, wherein each recording includes or involves an additional script or an additional executable file.

5. The computer-implemented method of claim 1, further comprising:
prior to deploying the first generative machine learning model, applying a set of security rules or a set of machine learning models to the recordings of activities or occurrences during operation of the network device resulting in a set of suspiciousness determinations, wherein the set of suspiciousness determinations are provided as part of the input.

6. The computer-implemented method of claim 1, further comprising:
prior to deploying the first generative machine learning model, performing a data balancing procedure such that the first generative machine learning model is provided a dataset that is more balanced between benign and suspicious examples than the historical log data.

7. The computer-implemented method of claim 1, further comprising:
performing an additional re-training procedure on the first generative machine learning model based on feedback received as user input.

8. A computing device, comprising:
a processor; and
a non-transitory computer-readable medium having stored thereon instructions that, when executed by the processor, cause the processor to perform operations including:
obtaining historical log data including a plurality of logs being recordings of activities or occurrences during operation of a network device, wherein each recording includes or involves a script or an executable file;
obtaining synthetic log data including a plurality of synthetic logs being synthetic data representative of activities or occurrences during operation of the network device, wherein the synthetic data include or involve synthetic scripts or synthetic executable files that include a label indicating whether each synthetic script or synthetic executable file is suspicious or benign;
deploying a first generative machine learning model by providing the historical log data and the synthetic log data as input, wherein the first generative machine learning model is trained and configured to generate training probabilistic labels indicating a first level of suspiciousness for each script or executable file of the historical log data; performing a re-training process or a fine-tuning process on a large language model (LLM) including:
processing a batch of the plurality of logs of the historical log data to generate second probabilistic labels indicating a second level of suspiciousness for each script or executable file of the batch of the plurality of logs,
determining a loss between the second probabilistic labels and corresponding labels of the training probabilistic labels, and
adjusting weights or parameters of the LLM according to the loss; and
storing the LLM following implementation of the re-training or the fine-tuning process.

9. The computing device of claim 8, wherein the script or the executable of each recording of the historical log data is a PowerShell script.

10. The computing device of claim 8, wherein the recordings of the historical log data are Windows Events.

11. The computing device of claim 8, wherein the operations further include:

deploying the LLM by providing additional log data including a second plurality of logs being additional recordings of activities or occurrences during subsequent operation of the network device, wherein each recording includes or involves an additional script or an additional executable file.

12. The computing device of claim 8, wherein the operations further include:

prior to deploying the first generative machine learning model, applying a set of security rules or a set of machine learning models to the recordings of activities or occurrences during operation of the network device resulting in a set of suspiciousness determinations, wherein the set of suspiciousness determinations are provided as part of the input.

13. The computing device of claim 8, wherein the operations further include:

prior to deploying the first generative machine learning model, performing a data balancing procedure such that the first generative machine learning model is provided a dataset that is more balanced between benign and suspicious examples than the historical log data.

14. The computing device of claim 8, wherein the operations further include:

performing an additional re-training procedure on the first generative machine learning model based on feedback received as user input.

15. A non-transitory computer-readable medium having stored thereon instructions that, when executed by one or more processors, cause the one or more processor to perform operations including:

obtaining historical log data including a plurality of logs being recordings of activities or occurrences during operation of a network device, wherein each recording includes or involves a script or an executable file;

obtaining synthetic log data including a plurality of synthetic logs being synthetic data representative of activities or occurrences during operation of the network device, wherein the synthetic data include or involve synthetic scripts or synthetic executable files that include a label indicating whether each synthetic script or synthetic executable file is suspicious or benign;

deploying a first generative machine learning model by providing the historical log data and the synthetic log data as input, wherein the first generative machine learning model is trained and configured to generate training probabilistic labels indicating a first level of suspiciousness for each script or executable file of the historical log data;

performing a re-training process or a fine-tuning process on a large language model (LLM) including:

processing a batch of the plurality of logs of the historical log data to generate second probabilistic labels indicating a second level of suspiciousness for each script or executable file of the batch of the plurality of logs, determining a loss between the second probabilistic labels and corresponding labels of the training probabilistic labels, and adjusting weights or parameters of the LLM according to the loss; and storing the LLM following implementation of the re-training or the fine-tuning process.

16. The non-transitory computer-readable medium of claim 15, wherein the script or the executable of each recording of the historical log data is a PowerShell script, and wherein the recordings of the historical log data are Windows Events.

17. The non-transitory computer-readable medium of claim 15, wherein the operations further include:

deploying the LLM by providing additional log data including a second plurality of logs being additional recordings of activities or occurrences during subsequent operation of the network device, wherein each recording includes or involves an additional script or an additional executable file.

18. The non-transitory computer-readable medium of claim 15, wherein the operations further include:

prior to deploying the first generative machine learning model, applying a set of security rules or a set of machine learning models to the recordings of activities or occurrences during operation of the network device resulting in a set of suspiciousness determinations, wherein the set of suspiciousness determinations are provided as part of the input.

19. The non-transitory computer-readable medium of claim 15, wherein the operations further include:

prior to deploying the first generative machine learning model, performing a data balancing procedure such that the first generative machine learning model is provided a dataset that is more balanced between benign and suspicious examples than the historical log data.

20. The non-transitory computer-readable medium of claim 15, wherein the operations further include:

performing an additional re-training procedure on the first generative machine learning model based on feedback received as user input.

* * * * *